US010595018B2

(12) United States Patent
Puri et al.

(10) Patent No.: US 10,595,018 B2
(45) Date of Patent: *Mar. 17, 2020

(54) CONTENT ADAPTIVE IMPAIRMENT COMPENSATION FILTERING FOR HIGH EFFICIENCY VIDEO CODING

(71) Applicant: Intel Corporation, Santa Clara, CA (US)

(72) Inventors: Atul Puri, Redmond, WA (US); Daniel Socek, Miami, FL (US)

(73) Assignee: Intel Corproation, Santa Clara, CA (US)

( * ) Notice: Subject to any disclaimer, the term of this patent is extended or adjusted under 35 U.S.C. 154(b) by 108 days.

This patent is subject to a terminal disclaimer.

(21) Appl. No.: 15/920,400

(22) Filed: Mar. 13, 2018

(65) Prior Publication Data

US 2018/0278933 A1    Sep. 27, 2018

Related U.S. Application Data

(60) Division of application No. 15/273,114, filed on Sep. 22, 2016, now abandoned, which is a continuation of
(Continued)

(51) Int. Cl.
*H04N 11/02* (2006.01)
*H04N 19/117* (2014.01)
(Continued)

(52) U.S. Cl.
CPC ......... *H04N 19/117* (2014.11); *H04N 19/124* (2014.11); *H04N 19/13* (2014.11);
(Continued)

(58) Field of Classification Search
CPC .... H04N 19/117; H04N 19/124; H04N 19/13; H04N 19/139; H04N 19/14;
(Continued)

(56) References Cited

U.S. PATENT DOCUMENTS 5,802,481 A    9/1998 Prieto
6,765,967 B2    7/2004 Dowling
(Continued)

FOREIGN PATENT DOCUMENTS

CN    101115201    1/2008
EP    1711019    10/2006
(Continued)

OTHER PUBLICATIONS

Advisory Action for U.S. Appl. No. 12/974,645, dated Nov. 17, 2014.
(Continued)

*Primary Examiner* — Jayanti K Patel
*Assistant Examiner* — Richard B Carter
(74) *Attorney, Agent, or Firm* — Green, Howard, & Mughal LLP.

(57) ABSTRACT

A system and method for quality restoration filtering is described that can be used either in conjunction with video coding, or standalone for postprocessing. It uses wiener filtering approach in conjunction with an efficient codebook representation.

22 Claims, 26 Drawing Sheets

Related U.S. Application Data application No. 14/657,696, filed on Mar. 13, 2015, now Pat. No. 9,912,947, which is a continuation of application No. 12/974,645, filed on Dec. 21, 2010, now Pat. No. 9,462,280.

(51) Int. Cl.

| | |
|---|---|
| H04N 19/70 | (2014.01) |
| H04N 19/46 | (2014.01) |
| H04N 19/61 | (2014.01) |
| H04N 19/14 | (2014.01) |
| H04N 19/174 | (2014.01) |
| H04N 19/82 | (2014.01) |
| H04N 19/86 | (2014.01) |
| H04N 19/139 | (2014.01) |
| H04N 19/18 | (2014.01) |
| H04N 19/124 | (2014.01) |
| H04N 19/13 | (2014.01) |
| H04N 19/51 | (2014.01) |
| H04N 19/172 | (2014.01) |
| H04N 19/176 | (2014.01) |
| H04N 19/184 | (2014.01) |

(52) U.S. Cl.
CPC .......... *H04N 19/139* (2014.11); *H04N 19/14* (2014.11); *H04N 19/174* (2014.11); *H04N 19/18* (2014.11); *H04N 19/46* (2014.11); *H04N 19/51* (2014.11); *H04N 19/61* (2014.11); *H04N 19/70* (2014.11); *H04N 19/82* (2014.11); *H04N 19/86* (2014.11); *H04N 19/172* (2014.11); *H04N 19/176* (2014.11); *H04N 19/184* (2014.11)

(58) Field of Classification Search
CPC ...... H04N 19/174; H04N 19/18; H04N 19/46; H04N 19/51; H04N 19/61; H04N 19/70; H04N 19/82; H04N 19/86; H04N 19/172; H04N 19/176; H04N 19/184
USPC .................. 375/240.02–240.03, 240.12; 1/1
See application file for complete search history.

(56) References Cited

U.S. PATENT DOCUMENTS

| | | | | |
|---|---|---|---|---|
| 9,462,280 | B2 * | 10/2016 | Puri ..................... | H04N 19/124 |
| 2003/0007583 | A1 | 1/2003 | Hilton et al. | |
| 2003/0039310 | A1 | 2/2003 | Wu et al. | |
| 2009/0175336 | A1 | 7/2009 | Karczewicz et al. | |
| 2010/0008417 | A1 | 1/2010 | Xu | |
| 2010/0074323 | A1 * | 3/2010 | Fu ....................... | H04N 19/147 375/240.02 |
| 2010/0074353 | A1 | 3/2010 | Zhou et al. | |
| 2010/0329361 | A1 | 12/2010 | Choi et al. | |
| 2012/0008687 | A1 | 1/2012 | Haskell | |
| 2012/0082217 | A1 * | 4/2012 | Haskell ............... | H04N 19/176 375/240.12 |
| 2012/0093217 | A1 | 4/2012 | Jeon et al. | |
| 2012/0155532 | A1 | 6/2012 | Puri et al. | |

FOREIGN PATENT DOCUMENTS

| | | |
|---|---|---|
| KR | 100960742 | 5/2010 |
| KR | 1020100101693 | 9/2010 |
| WO | 2010127886 | 11/2010 |
| WO | 20120883259 | 6/2012 |
| WO | 2012088359 | 11/2012 |

OTHER PUBLICATIONS

English Translation of Notice of Preliminary Rejection for Korean Patent Application No. 2013-7017009, dated Feb. 26, 2015.
Final Office Action for U.S. Appl. No. 12/974,645, dated Sep. 10, 2014.
Final Office Action for U.S. Appl. No. 14/657,696, dated Dec. 16, 2016.
Final Office Action for U.S. Appl. No. 15/273,114 dated Dec. 13, 2017.
International Preliminary Report on Patentability for PCT Patent Application No. PCT/US2011/066670, dated Jul. 4, 2013.
International Search Report and Written Opinion for PCT Application No. PCT/US2011/066670, dated Aug. 29, 2012.
Non-Final Office Action for U. S. Appl. No. 14/657,696, dated Aug. 12, 2016.
Non-Final Office Action for U.S. Appl. No. 12/974,645, dated Mar. 12, 2015.
Non-Final Office Action for U.S. Appl. No. 12/974,645, dated Mar. 18, 2014.
Notice of Allowance for Chinese Patent Application No. 201180061488.3, dated Aug. 17, 2016.
Notice of Allowance for Korean Application No. 2013-7017009, dated Oct. 7, 2015.
Notice of Allowance for U.S. Appl. No. 14/657,696 dated Nov. 1, 2017.
Office Action for Chinese Patent Application No. 201180061488.3, dated Jun. 20, 2016.
Office Action for Chinese Patent Application No. 201180061488.3, dated Nov. 3, 2015.
Office Action for U.S. Appl. No. 14/657,696 dated Aug. 15, 2017.
Office Action for U.S. Appl. No. 15/273,114, dated Jun. 1, 2017.
Restriction Requirement for U.S. Appl. No. 14/657,696, dated Mar. 31, 2016.
Restriction Requirement for U.S. Appl. No. 15/273,114, dated Jan. 23, 2017.
Chujoh, et al., "Specification and experimental results of quadtree-based adaptive loop filter", ITU-Telecommunications Standardization Sector, VCEG-AK22, Apr. 2009, 11 pages.
Chujoh, T. et al., "Block-based adaptive loop filter", ITU-Telecommunications Standardization Sector, VCEG, VCEG-AI18, Germany, Jul. 2008.
Dong, Jie, "H265.net, Witness the development of H.265 Two Loop Filters in KTA", Aug. 1, 2009.
Liu, Yu, "H265.net, Witness the development of H.265 adaptive Post/Loop Filters in JM/KTA-Part 1", Aug. 22, 2009.
Liu, Yu, "H265.net, Witness the development of H.265 adaptive Post/Loop Filters in JM/KTA-Part 2", Aug. 23, 2009.
Office Action for Chinese Patent Application No. 201610854915.8, dated Jul. 2, 2019. No translation available.

* cited by examiner

Fig. 5a
Fig. 5b
Fig. 5c
Fig. 5d
Fig. 5e
Fig. 5f
Fig. 5g
Fig. 5h

| 1 | -1 | 2 | 1 | 1 | 2 | -2 | 0 | 1 |
|---|---|---|---|---|---|---|---|---|
| 0 | 1 | -1 | 4 | -15 | 3 | -1 | 1 | 0 |
| -3 | 9 | -15 | 11 | 9 | 18 | -18 | 11 | -5 |
| 9 | -23 | 39 | -36 | 8 | -51 | 40 | -23 | 10 |
| -18 | 31 | -36 | 11 | 1091 | 1 | -28 | 28 | -17 |
| 10 | -25 | 44 | -56 | 3 | -32 | 32 | -20 | 7 |
| -2 | 6 | -14 | 23 | 3 | 15 | -15 | 8 | -1 |
| 0 | 0 | -1 | -3 | -8 | -5 | 8 | -5 | 2 |
| 1 | 3 | 4 | -1 | 1 | 2 | -5 | 4 | -1 |

*Fig.6a*

| 1 | -1 | 2 | 1 | 1 | 2 | -2 | 0 | 1 |
|---|---|---|---|---|---|---|---|---|
| 0 | 1 | -1 | 4 | -15 | 3 | -1 | 1 | 0 |
| -3 | 9 | -15 | 11 | 9 | 18 | -18 | 11 | -5 |
| 9 | -23 | 39 | -36 | 8 | -51 | 40 | -23 | 10 |
| -18 | 31 | -36 | 11 | 1091 | 11 | -36 | 31 | -18 |
| 10 | -23 | 40 | -51 | 8 | -36 | 39 | -23 | 9 |
| -5 | 11 | -18 | 18 | 9 | 11 | -15 | 9 | -3 |
| 0 | 1 | -1 | 3 | -15 | 4 | -1 | 1 | 0 |
| 1 | 0 | -2 | 2 | 1 | 1 | 2 | -1 | 1 |

*Fig.6b*

| -34 | -17 | -25 | 4 | 121 | -4 | -3 | 2 | -42 |
|---|---|---|---|---|---|---|---|---|
| -10 | 4 | -14 | 7 | 86 | -2 | -5 | 11 | -37 |
| -74 | -20 | -14 | -18 | 82 | 3 | -22 | -20 | -64 |
| -15 | -2 | 6 | 0 | 125 | 16 | -5 | 11 | 91 |
| 158 | 56 | 31 | 55 | 173 | 34 | 20 | 51 | 189 |
| 87 | 20 | 3 | 22 | 114 | 15 | -16 | 4 | -5 |
| -56 | 12 | -19 | -15 | 85 | -5 | -19 | -13 | -98 |
| -28 | 8 | 2 | -5 | 74 | 5 | -5 | 6 | -13 |
| -40 | -8 | -16 | 2 | 112 | 12 | -20 | -15 | -28 |

*Fig.6c*

| -34 | -17 | -25 | 4 | 121 | -4 | -3 | 2 | -42 |
|---|---|---|---|---|---|---|---|---|
| -10 | 4 | -14 | 7 | 86 | -2 | -5 | 11 | -37 |
| -74 | -20 | -14 | -18 | 82 | 3 | -22 | -20 | -64 |
| -15 | -2 | 6 | 0 | 125 | 16 | -5 | 11 | 91 |
| 158 | 56 | 31 | 55 | 173 | 34 | 20 | 51 | 189 |
| 91 | 11 | -5 | 16 | 125 | 0 | 6 | -2 | -15 |
| -64 | -20 | -22 | 3 | 82 | -18 | -14 | -20 | -74 |
| -37 | 11 | -5 | -2 | 86 | 7 | -14 | 4 | -10 |
| -42 | 2 | -3 | -4 | 121 | 4 | -25 | -17 | -34 |

*Fig.6d*

CONTENT ADAPTIVE IMPAIRMENT COMPENSATION FILTERING FOR HIGH EFFICIENCY VIDEO CODING

CLAIM OF PRIORITY

This application is a divisional of U.S. patent application Ser. No. 15/273,114, filed on Sep. 22, 2016, which is a continuation of U.S. patent application Ser. No. 14/657,696, filed on Mar. 13, 2015, which is a continuation of U.S. patent application Ser. No. 12/974,645, filed on Dec. 21, 2010, now, U.S. Pat. No. 9,462,280, which are incorporated by reference in their entireties for all purposes.

FIELD

This disclosure relates to encoding and decoding of video signals, and more particularly, to codebook-based encoding and decoding of adaptive filters used for quality restoration.

BACKGROUND

The advent of digital multimedia such as digital images, speech/audio, graphics, and video have significantly improved various applications as well as opened up brand new applications due to relative ease by which it has enabled reliable storage, communication, transmission, and, search and access of content. Overall, the applications of digital multimedia have been many, encompassing a wide spectrum including entertainment, information, medicine, and security, and have benefited the society in numerous ways. Multimedia as captured by sensors such as cameras and microphones is often analog, and the process of digitization in the form of Pulse Coded Modulation (PCM) renders it digital. However, just after digitization, the amount of resulting data can be quite significant as is necessary to re-create the analog representation needed by speakers and/or TV display. Thus, efficient communication, storage or transmission of the large volume of digital multimedia content requires its compression from raw PCM form to a compressed representation. Thus, many techniques for compression of multimedia have been invented. Over the years, video compression techniques have grown very sophisticated to the point that they can often achieve high compression factors between 10 and 100 while retaining high psycho-visual quality, often similar to uncompressed digital video.

While tremendous progress has been made to date in the art and science of video compression (as exhibited by the plethora of standards bodies driven video coding standards such as MPEG-1, MPEG-2, H.263, MPEG-4 part2, MPEG-4 AVC/H.264, MPEG-4 SVC and MVC, as well as industry driven proprietary standards such as Windows Media Video, RealVideo, On2 VP, and the like), the ever increasing appetite of consumers for even higher quality, higher definition, and now 3D (stereo) video, available for access whenever, wherever, has necessitated delivery via various means such as DVD/BD, over the air broadcast, cable/satellite, wired and mobile networks, to a range of client devices such as PCs/laptops, TVs, set top boxes, gaming consoles, portable media players/devices, and smartphones, fueling the desire for even higher levels of video compression. In the standards-body-driven standards, this is evidenced by the recently started effort by ISO MPEG in High Efficiency Video coding which is expected to combine new technology contributions and technology from a number of years of exploratory work on H.265 video compression by ITU-T standards committee.

All aforementioned standards employ a general inter-frame predictive coding framework that involves reducing temporal redundancy by compensating for motion between frames of video by first dividing a frame into blocks and assigning motion vector/s to each block of a frame to be coded, with respect to a past decoded frame; these motion vectors are then transmitted to the decoder and used to generate a motion compensated prediction frame that is differenced with a past decoded frame and coded block by block, often by transform coding. It has been long recognized that at high compression factors at which today's state of the art codecs operate, motion compensated transform coding process may generate coding artifacts that range from coding noise (e.g. mosquito effects), blockiness, bleeding, to ringing. In fact to mitigate some of these coding artifacts, most state of the art codecs include deblocking filters as well as sometimes ringing, as postprocessing filters. Often deblocking is done in-loop as compared to postprocessing that can be done out of loop. Often such deblocking is able to suppress visual quality artifacts but does not give much coding quality gain.

Recognizing this, over last few years research effort has been underway to design additional filters that can improve both the visual and coding quality. Further, since coding quality can vary a lot depending on content of video sequences, contrast ratio, noise level, and operating bit-rates, it is desirable that the filters are adaptive rather than fixed to get maximum benefit of such a filter to improve prediction and thus help improve compression efficiency. The mathematical procedure used to compute filter coefficients is based on Wiener Hopf equation and computes filter coefficients (e.g. an array of 5×5 or 7×7 or 9×9 coefficients), which are either directly or differentially sent for each frame of every video sequence.

According to the basic theory of adaptive filtering, cross-correlation and autocorrelation matrices are accumulated, from which the optimal Wiener filter can be computed by solving the Wiener Hopf equation as follows.

Let x(n) be the input signal, y(n) be the output, and h(n) represent filter coefficients.

Filter Output:

$$y(n) = \sum_{k=0}^{N-1} h(k)x(n-k)$$

Error Signal:

$$e(n) = d(n) - y(n)$$

Mean Square Error:

$$J = E[e^2(n)]$$

In Vector Form:

$$x(n) = \begin{bmatrix} x(n) \\ x(n-1) \\ \vdots \\ x(n-N+1) \end{bmatrix}$$

and

-continued $$h = \begin{bmatrix} h(0) \\ x(1) \\ \vdots \\ x(N-1) \end{bmatrix}$$

$$y(n) = h^T x(n) = x(n)^T h$$

$$E[e^2(n)] = E[(d(n) - y(n))^2]$$
$$= E[d^2(n)] - 2E[d(n)x(n)^T]h + h^T E[x(n)x(n)^T]h$$
$$= P_d - 2R_{dx}^T h + h^T R_{xx} h$$

Where, $P_d$ is a scalar.
Crosscorrelation Row Vector:

$$R_{dx} = E[d(n)x(n)^T]$$

Autocorrelation Matrix:

$$R_{xx} = E[x(n)x(n)^T]$$

To find minimum, the derivative is taken and set to zero as follows:

$$\frac{\partial E[e^2(n)]}{\partial h(k)} = -2R_{dx}^T + 2R_{xx}h = 0$$

Solving for h, the Wiener Hopf equation is as follows:

$$h = R_{xx}^{-1} R_{dx}$$

The Wiener Hopf equation determines optimum filter coefficients in mean square error, and the resulting filter is called the 'wiener' filter.

In the above equation, h is the vector of filter coefficients, $R_{xx}$ is the autocorrelation matrix (or block data of reference frame) and $R_{dx}$ is a cross-correlation matrix/row vector (between the source frame and reference frame block data).

While the aforementioned mathematical procedure can calculate filter coefficients, there are significant issues in practical integration of this approach in a video coding system. In context of H.264 and H.265 development, a number of proposals have been made to address Picture Based (ALF); Block Based (ALF); Quad-tree Based (QALF); Spatial prediction of coefficients; Postfilter.

A limitation, however, is that the process is computationally expensive (non-separable filters require more computations than separable filters), iterative typically requiring 3-12 full iterations to compute filter coefficients, and further often requires sending of many coefficients (40-80 coefficients) per frame, which even when differentially coded can cost for instance around 300-600 bits per frame of Common Intermediate Format ("CIF") resolution video, while offering at times limited gains (e.g, due to rounding of coefficients, standard coefficients being good match to the content etc). Further some methods send a macroblock or quad-tree based block map to indicate blocks where such filter is turned 'on' or 'off'; this process can increase overhead bit cost by another 200-400 bits, such that the total bit cost per frame of 500-1000 bits. This makes such a system expensive in overhead bit cost, inflexible, and excessively complex.

Additional information related to adaptive filtering may be found in the following references, each of which is incorporated fully by reference, for all purposes:

T. Chujoh et al, "Block Based Adaptive Loop Filter," ITU-Telecommunications Standardization Sector, VCEG, VCEG-AI18, Germany, July 2008.

T. Chujoh et al, "Specification and experimental results of Quad-tree-based Adaptive Loop Filter," ITU-Telecommunications Standardization Sector, VCEG, VCEG-AK22, Japan, April 2009.

BRIEF DESCRIPTION OF THE DRAWINGS

FIGS. 5a-h show coefficient-pixel locations of various filters used in quality restoration filtering, in accordance with various embodiments.

FIGS. 6a-d show exemplary coefficients of various filter used in quality restoration filtering, in accordance with various embodiments.

DETAILED DESCRIPTION

Figure 1:
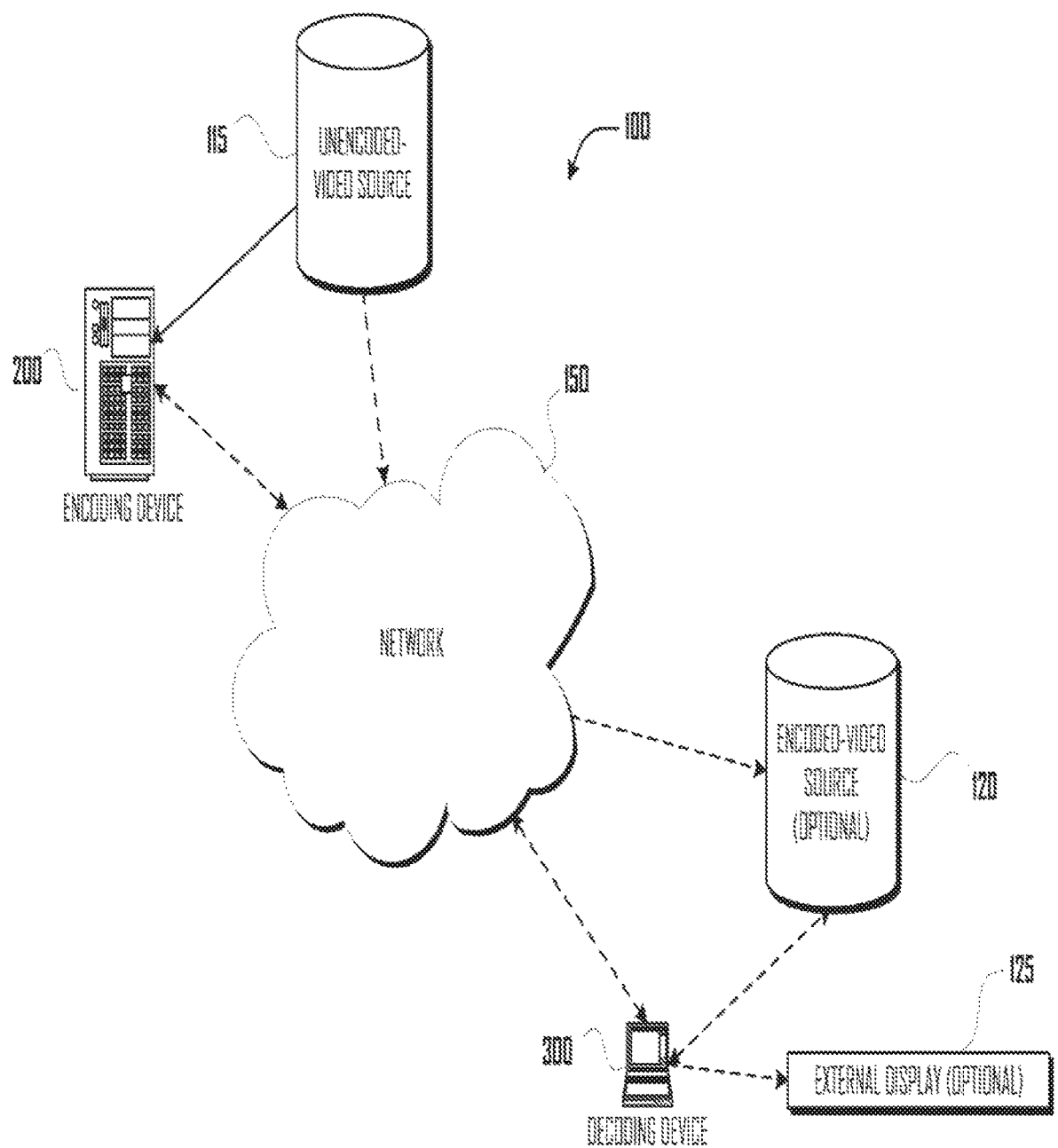
FIG. 1 illustrates an exemplary video encoding/decoding system according to one embodiment.

The detailed description that follows is represented largely in terms of processes and symbolic representations of operations by conventional computer components, including a processor, memory storage devices for the processor, connected display devices and input devices. Furthermore, these processes and operations may utilize conventional computer components in a heterogeneous distributed computing environment, including remote file Servers, computer Servers and memory storage devices. Each of these conventional distributed computing components is accessible by the processor via a communication network.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise.

Overview

As discussed below, in accordance with various embodiments, content adaptive techniques may be employed to perform quality-restoration filter coefficients calculation and codebook-based representation to perform filtering to improve coding efficiency in motion-compensated video coding. Various systems and methods for quality-restoration filtering of video to improve prediction efficiency of inter-frame video coding are described herein.

Various techniques, as described below, may be efficient in bits, as only an index to a filter stored in the codebook may be transmitted, as opposed to transmitting the filter itself. Coding an index is far more efficient than coding actual coefficients or sending differentially encoded filter coefficients. While the number of actual indices sent depends on the number of partitions, the techniques described below may be more efficient in bit-rate than previous approaches using similar partition types.

The techniques described below may additionally offer reduced computational complexity, as unlike existing non-codebook based solutions, they may avoid the need to simultaneously compute wiener filters of different sizes (e.g. 5×5, 7×7, 9×9) and/or types (e.g., non-symmetric and point symmetric) and iteratively compute block maps where filters will be applied or not, and then again re-compute improved filters of these sizes and types to select the best candidate based on exhaustive rate distortion optimization. Instead, the techniques described below rely on content-based processing to decide filter sizes and filter types, while retaining the capability of using block-maps if desired. At the same time, the techniques described below may efficiently search a codebook to determine the best candidate.

Further, the techniques described below may offer flexibility, allowing the use of a codebook as is, while offering the ability to correct the best filter available from codebook with a spectral update in relatively few bits (which is still more efficient than sending coefficients themselves). The accuracy of the spectral update can be controlled. Additionally, the techniques described below allow portions of the codebook to be replaced or the codebook to be extended by adding corrected filters that may be better suited to the video sequence to be coded, thus increasing the overall efficiency of the codebook design.

The techniques described below also can work on pictures, slice groups, block maps, merged block maps, or adaptive partitions such as bi-tree, quad-tree, or content dependent regions. The ability of the techniques described below to work with content dependent partitions also reduces complexity and improves accuracy as compared to other techniques that are driven solely by rate distortion optimization.

Details of filter codebook design and efficient search of codebook are described below. With the described method of codebook design and for suggested codebook size, the techniques described below may result in good quality restoration filtering, increasing prediction efficiency for a broad spectrum of video content.

In various embodiments, the techniques described below can be integrated in typical video coding that use traditional picture structures composed of I-, P-, B-picture coding. In other embodiments, the techniques described below can be integrated in video coding that uses other structures in addition to I-, and P-pictures, such as hierarchical B-pictures, unidirectional B-pictures, and/or B-picture alternatives.

In various embodiments, the codebook based Quality-Restoration ("QR") filtering described below can be used as in-loop without display of the filtered picture, in-loop with display of the filtered picture, and/or as post-processing-only with display of filtered picture. Its use in-loop may allow for compression efficiency gains in addition to visual quality improvement.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosedherein.

FIG. 1 illustrates an exemplary video encoding/decoding system 100 according to one embodiment including an unencoded-video source 115, an encoding device 200 (see FIG. 2, discussed below), decoding device 300 (see FIG. 3, discussed below) with an optional external display 125, and an optional encoded-video source 120. In some embodiments, one or both of encoding device 200 and/or decoding device 300 may be connected to a network 150. In some embodiments, decoding device 300 and encoding device 200 may comprise a single device.

In some embodiments, other servers and/or devices (not shown) may also be present. For example, in some embodiments, a distribution server (not shown) may distribute encoded video to decoding device 300 via network 150.

In some embodiments, encoding device 200 may communicate with unencoded-video source 115 via network 150, a storage area network ("SAN"), a high speed serial bus, and/or via other suitable communication technology. Similarly, in some embodiments, decoding device 300 may communicate with encoded-video source 120 via network 150, a storage area network ("SAN"), a high speed serial bus, and/or via other suitable communication technology. In some embodiments, encoding device 200, decoding device 300, encoded-video source 120, and/or unencoded-video source 115 may comprise one or more replicated and/or distributed physical or logical devices.

In various embodiments, network 150 may include the Internet, a local area network ("LAN"), a wide area network ("WAN"), a cellular data network, and/or other data network. In many embodiments, there may be more encoding devices 200, decoding devices 300, encoded-video sources 120, and/or unencoded-video sources 115 than are illustrated.

Figure 2:
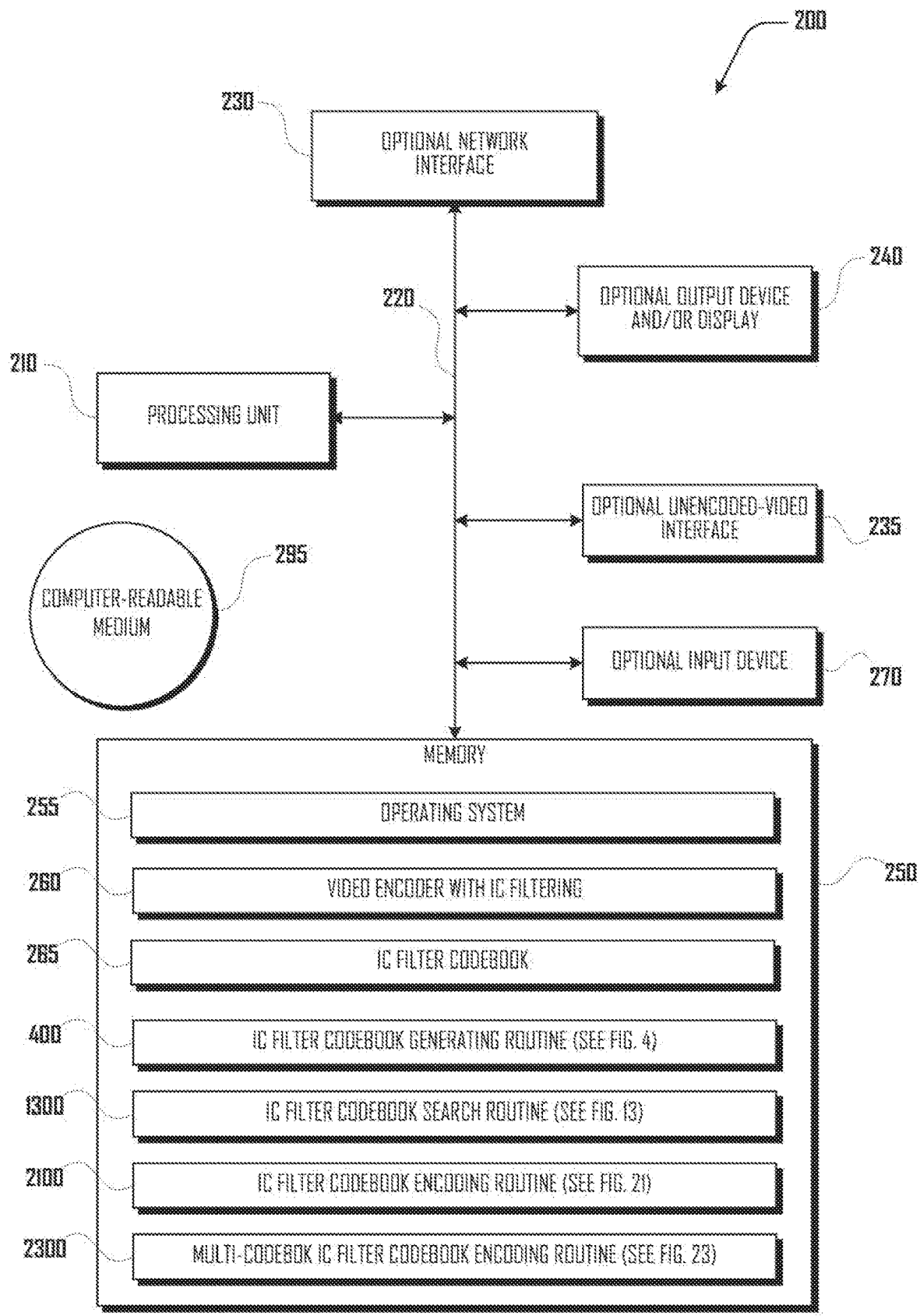
FIG. 2 illustrates several components of an exemplary encoding device, in accordance with one embodiment.

FIG. 2 illustrates several components of an exemplary encoding device 200, in accordance with one embodiment. In some embodiments, encoding device 200 may include many more components than those shown in FIG. 2. However, it is not necessary that all of these generally conventional components be shown in order to disclose an illustrative embodiment. As shown in FIG. 2, encoding device 200 includes an optional network interface 230 for optionally connecting to the network 150.

The Encoding device 200 also includes a processing unit 210, a memory 250, an optional output device and/or display 240, and an optional input device 270 (e.g., a keyboard, mouse, remote, joy stick, and the like), all interconnected along with the optional network interface 230 via a bus 220. The memory 250 generally comprises a random access memory ("RAM"), a read only memory ("ROM"), and a permanent mass storage device, such as a disk drive. The memory 250 stores a QR filter Codebook 265, program code for a Video Encoder with QR Filtering 260, as well as a QR filter codebook generating routine 400 (see FIG. 4, discussed below), QR Filter Codebook Search routine 1300 (see FIG. 13, discussed below), QR Filter Codebook encoding routine (see FIG. 21, discussed below), and Multi-Codebook QR Filter Codebook encoding routine (see FIG. 23, discussed below). In addition, the memory 250 also stores an operating system 255. These software components may be loaded from a computer readable storage medium 295 into memory 250 of the Encoding device 200 using a drive mechanism (not shown) associated with a non-transient computer readable storage medium 295, such as a floppy disc, tape, DVD/CD-ROM drive, memory card, or the like. In some embodiments, software components may also be loaded via the optional network interface 230, rather than via a computer readable storage medium 295.

In some embodiments, encoding device 200 may further comprise a specialized interface 235 for communicating with unencoded-video source 115, such as a high speed serial bus, or the like. In some embodiments, encoding device 200 may communicate with unencoded-video source 115 via network interface 230. In other embodiments, unencoded-video source 115 may reside in memory 250.

Although an exemplary Encoding device 200 has been described that generally conforms to conventional general purpose computing devices, an encoding device 200 may be any of a great number of devices capable of encoding video, for example, a video recording device, a video co-processor and/or accelerator, a personal computer, a game console, a set-top box, a handheld computer, a cell phone, or any other suitable device.

Figure 3:
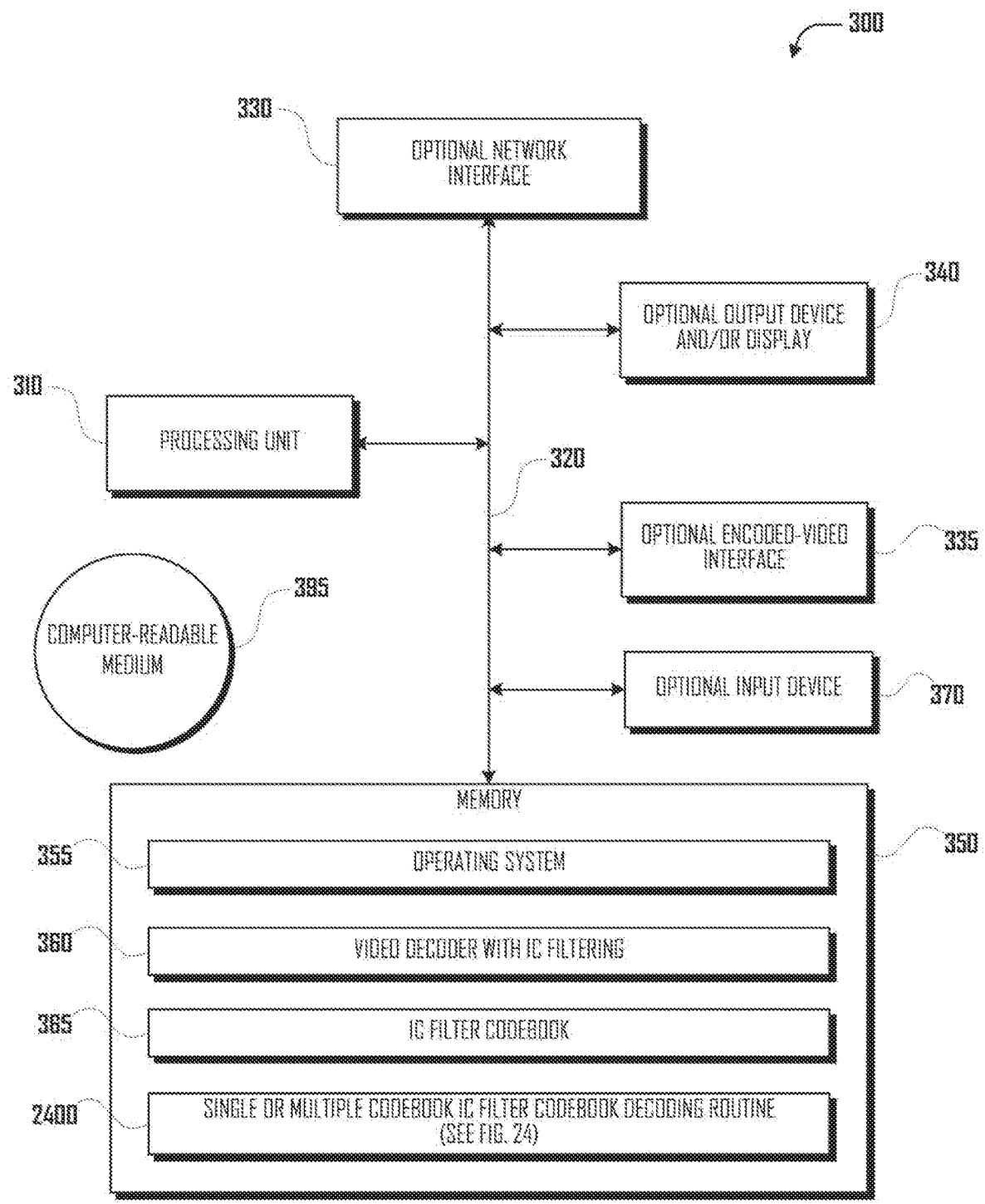
FIG. 3 illustrates several components of an exemplary decoding device, in accordance with one embodiment.

FIG. 3 illustrates several components of an exemplary decoding device 300, in accordance with one embodiment. In some embodiments, decoding device 300 may include many more components than those shown in FIG. 3. However, it is not necessary that all of these generally conventional components be shown in order to disclose an illustrative embodiment. As shown in FIG. 3, decoding device 300 includes an optional network interface 330 for optionally connecting to the network 150.

The Decoding device 300 also includes a processing unit 310, a memory 350, an optional output device and/or display 340, and an optional input device 370 (e.g., a keyboard, mouse, remote, joy stick, and the like), all interconnected along with the optional network interface 330 via a bus 320. The memory 350 generally comprises a random access memory ("RAM"), a read only memory ("ROM"), and a permanent mass storage device, such as a disk drive. The memory 350 stores program code for a Video decoder with QR Filtering 360, a QR Filter Codebook 365 (a duplicate copy of QR Filter Codebook 265), program code for a QR Filtering Codebook decoder 360, and QR Filter Codebook decoding routine (see FIG. 24, discussed below). In addition, the memory 350 also stores an operating system 355. These software components may be loaded from a computer readable storage medium 395 into memory 350 of the Decoding device 300 using a drive mechanism (not shown) associated with a non-transient computer readable storage medium 395, such as a floppy disc, tape, DVD/CD-ROM drive, memory card, or the like. In some embodiments, software components may also be loaded via the optional network interface 330, rather than via a computer readable storage medium 395.

In some embodiments, decoding device 300 may further comprise a specialized interface 335 for communicating with encoded-video source 120, such as a high speed serial bus, or the like. In some embodiments, decoding device 300 may communicate with encoded-video source 120 via network interface 330. In other embodiments, encoded-video source 115 may reside in memory 350.

Although an exemplary Decoding device 300 has been described that generally conforms to conventional general purpose computing devices, an decoding device 300 may be any of a great number of devices capable of decoding video, for example, a video-play device, a personal computer, a game console, a set-top box, a handheld computer, a cell phone, or any other suitable device.

Figure 4:
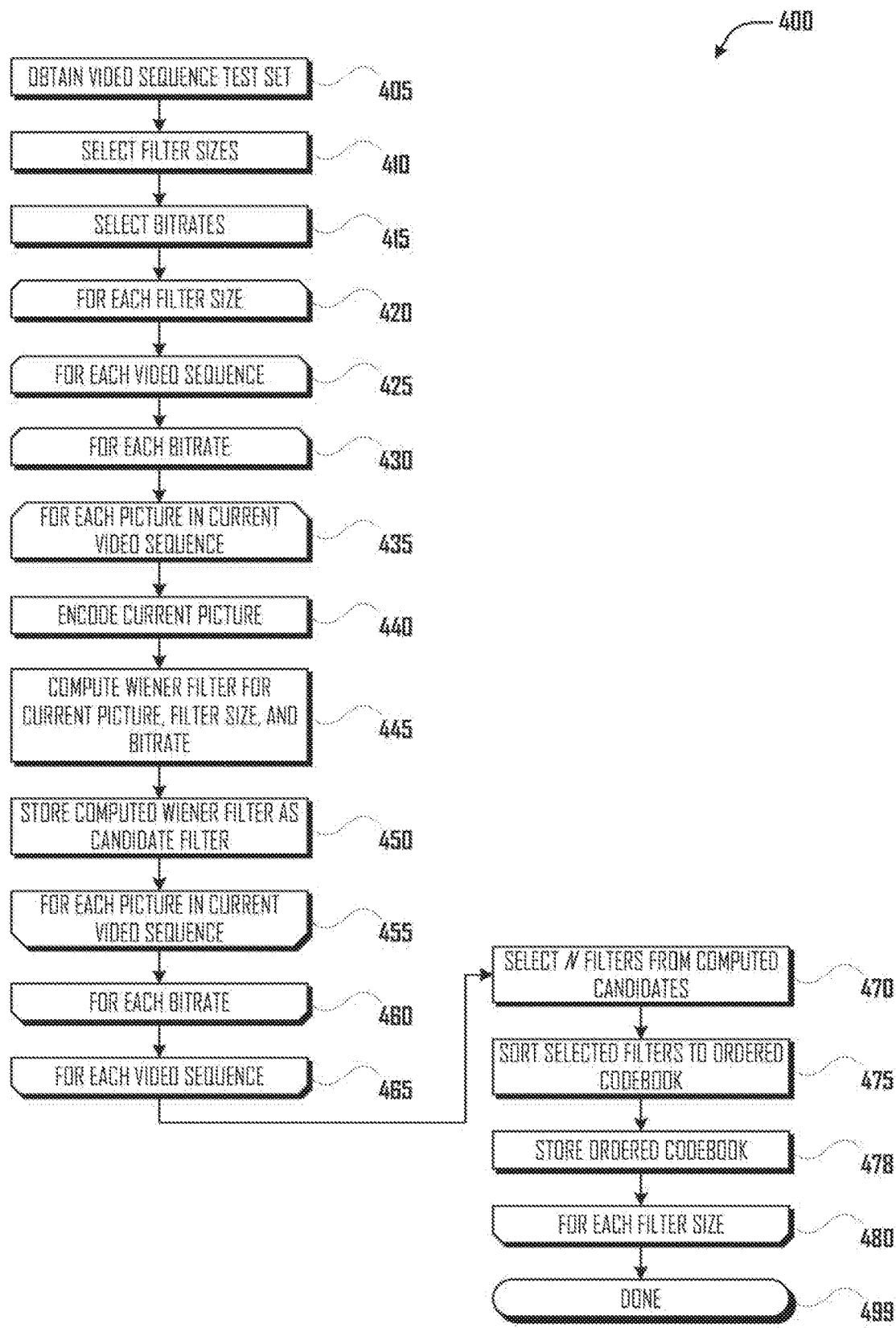
FIG. 4 illustrates an "offline" routine for generating a codebook representing a plurality of sets of Quality-Restoration ("QR") Filter Coefficients, in accordance with one embodiment.

FIG. 4 illustrates an "offline" routine 400 for generating a codebook representing a plurality of sets of QR filter coefficients, in accordance with one embodiment. In some embodiments, routine 400 may take hours or even days to perform.

In block 405, a test set including a number of video sequences (e.g. 25 to 50), each with a number (e.g. 20-100) of frames, is obtained. In some embodiments, some or all of the video sequences may be selected from one or more pre-existing video sequences. In other embodiments, some or all of the video sequences may be developed for use with routine 400. In some embodiments, some or all of the video sequences may have a variety of characteristics, such as a high contrast, low contrast, high motion, low motion, bright, dark, and the like. In block 410, one or more filter sizes are selected. For example, in one embodiment, one or more of 5×5, 7×7, and 9×9 filter sizes may be selected. In block 415, one or more target bitrates are selected. For example, in one embodiment, one or more of low, medium, and high bitrates may be selected.

Beginning in starting loop block 420, each of the filter sizes is addressed in turn. Beginning in starting loop block 425, each of the video sequences is processed in turn. Beginning in starting loop block 430, each of the selected bitrates is addressed in turn. Beginning in starting loop block 435, each picture or frame within the current video sequence is processed inturn.

In block 440, the current picture is encoded by a video encoder. In block 445, the Wiener filter is computed for the current picture, filter size, and bitrate by comparing the encoded picture with the original un-encoded video. In block 450, the computed Wiener filter is stored at least temporarily as a candidate Wiener filter.

In ending loop block 455, routine 400 loops back to block 435 to process the next picture in the current video sequence (if any). In ending loop block 460, routine 400 loops back to block 430 to process the next bitrate (if any). In ending loop block 465, routine 400 loops back to block 425 to process the next video sequence (if any).

Once all pictures in all video sequences have been processed for each bitrate, in block 470, a subset (e.g. 256) of distinct Wiener filters from among the computed candidate Wiener filters is selected to cover a range of filter characteristics (e.g., from smooth to sharp) from low- to high-contrast.

In block 475, the subset of selected filters are sorted (e.g., in ascending order according to the center coefficient (or other representative parameter), e.g., from smooth to sharp (see FIGS. 6a-d), and stored in a codebook of filter coefficients for the current filter size.

In ending loop block 480, routine 400 loops back to block 420 to process the next filter size (if any). Having generated a codebook for each filter size, routine 400 ends in block 499, the generated codebooks being made available for use by various encoders and decoders.

Figures 5A, 5B, 5C, 5D, 5E, 5F, 5G, 5H:
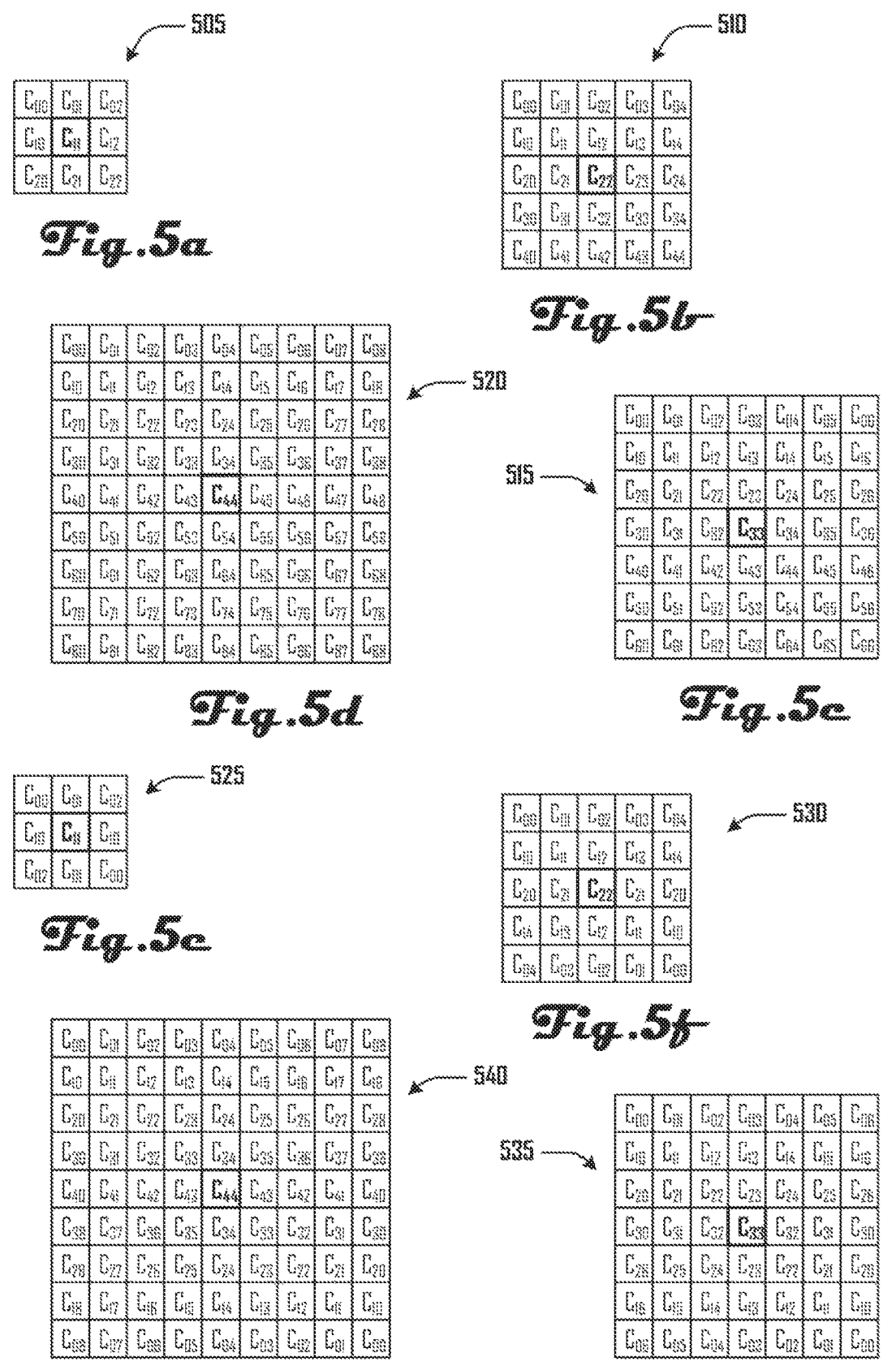

FIGS. 5a-d respectively illustrate sets of QR filter coefficients of 3×3, 5×5, 7×7, and 9×9 non-separable filters, such as may be used in quality restoration filtering in various embodiments. For instance, as illustrated in FIG. 5a, in the case of 3×3 filtering, a filtered decoded picture is created pixel-by-pixel by applying 3×3 filter coefficients 505 with center coefficient $c_{11}$ aligned with the pixel being filtered using the weighted value of that pixel and the surrounding 5 pixels with weighting values given by the filter coefficients. Since the filter is non-separable, all 9 coefficients can have unique values. Similarly, as illustrated in FIG. 5d, for the case of 9×9 non-symmetric filtering, the pixel to be filtered is aligned with center coefficient $c_{44}$ and uses, in addition to that pixel, the surrounding 50 pixels, with each filtered pixel being a weighted combination of 51 pixels; the filtered pixels are written out as a separate filtered decoded picture that can be used as reference for prediction and perhaps even for display. In various embodiments, the coefficients 510, 515 illustrated in FIGS. 5b and 5c may be applied in a similar manner.

Likewise, FIGS. 5e-h respectively illustrate the coefficients of 3×3, 5×5, 7×7, and 9×9 point symmetric filters such as may be used in quality restoration filtering in some embodiments. For instance, as illustrated in FIG. 5e, in case of 3×3 filtering, a filtered decoded picture is created pixel-by-pixel by applying 3×3 filter coefficients 525 with center coefficient $c_{11}$ aligned with pixel being filtered using the weighted value of that pixel and surrounding 5 pixels with weighting values given by the filter coefficients. Since the filter is point symmetric, only 5 coefficients $c_{00}$, $c_{01}$, $c_{02}$, $c_{10}$, $c_{11}$ can have unique values with other coefficients simply being diagonally symmetric. Similarly, as illustrated in FIG. 5h, for the case of 9×9 point symmetric filtering, only 41 coefficients are unique, the others being diagonally symmetric. The pixel to be filtered is aligned with center coefficient $c_{44}$ and uses, in addition to that pixel, the surrounding 50 pixels, with each filtered pixel being a weighted combination of 51 pixels; the filtered pixels are written out as a separate filtered decoded picture that can be used as reference for prediction and perhaps even for display. In various embodiments, the coefficients 530, 535 illustrated in FIGS. 5f and 5g may be applied in a similar manner.

FIG. 6a shows exemplary coefficients of a 9×9 non-separable 'sharp' filter used in quality restoration filtering. FIG. 6b shows exemplary coefficients of a 9×9 point symmetric 'sharp' filter used in quality restoration filtering. FIG. 6c shows exemplary coefficients of a 9×9 non-separable 'smooth' filter used in quality restoration filtering. FIG. 6d shows exemplary coefficients of a 9×9 point symmetric 'smooth' filter used in quality restoration filtering.

Figure 7:
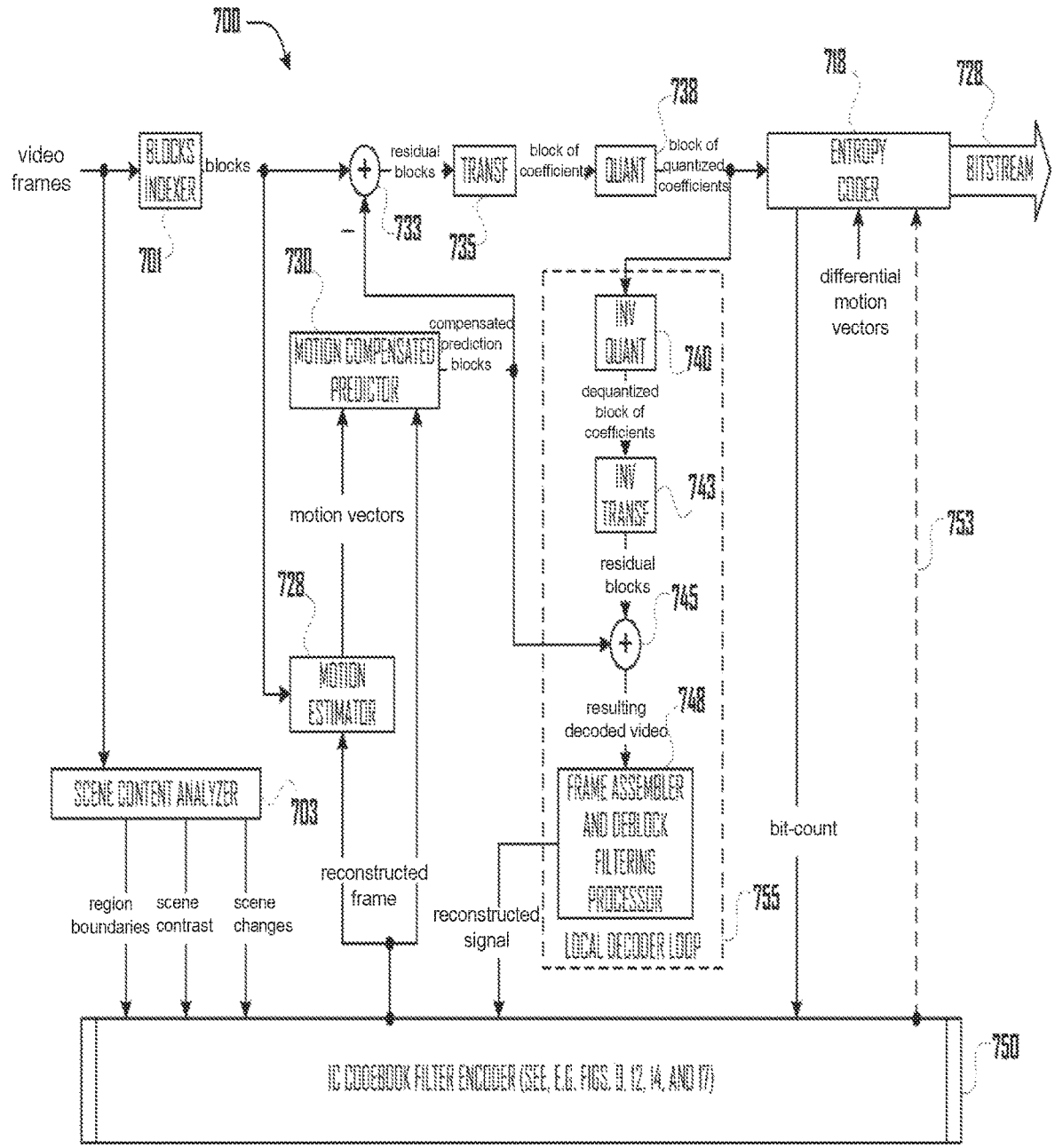
FIG. 7 illustrates a video encoder including a QR Codebook Filter Encoder, in accordance with one embodiment.

FIG. 7 shows a general block diagram of interframe encoder 700 employing motion compensated prediction and codebook-based in-loop quality restoration filtering in accordance with one embodiment. One or more video frames (vidfrms) are provided to blocks indexer 701 and scene content analyzer 703. Scene content analyzer 703 analyzes the one or more video frames (vidfrms) and outputs a flag indicating scene changes (scnchg), as well as signals indicating image characteristics, such as scene contrast (contr), and region boundaries (regbnd) within the frame. Blocks indexer 701 divides the one or more video frames (vidfrms) into blocks (blks), which are input one a time to differencer 733 and differenced with corresponding prediction signal blocks (pred). Blocks (blks) are also provided to motion estimator 728 (discussed below). After differencing at differencer 733, the resulting residual (res) is forward transformed to a frequency-domain representation by transformer 735, resulting in a block of coefficients (tcof) that is then sent to the quantizer 738 resulting in a block of quantized coefficients (qcf) that are sent both to the entropy coder 718 and to the inverse quantizer 740. Inverse quantizer 740 sends de-quantized block of coefficients (tcof) to the inverse transformer 743. At adder 745, the prediction block (pred) from the motion compensation loop is added to the de-quantized residual block (res') at the output of inverse transformer 743. Adder 745 outputs the locally decoded block (rec), which is then sent to the frame assembler and deblock filter processor 748, which reduces the blockiness. The blocks (recd) at the output of frame assembler and deblock filtering processor 748 form a frame that is processed by QR Codebook Filter Encoder 750 to quality-restored reconstructed frame (recf), which is used as the reference frame for motion estimator 728 and motion compensated predictor 730. The motion estimator 728 computes motion vectors (mv) between blocks (blks) of original video frame with respect to quality-restored reconstructed frame (recf). In some embodiments, the process of motion vector computation comprises computing an integer pel vector per block, followed by a subpel vector (e.g., to ¼ pel resolution). The entropy coder 718 encodes the quantized transform coefficients (qcf), differential motion vectors (dmv), and other data (including one or more signals 753 from QR Codebook Filter Encoder 750, generating a compressed bitstream 728. In some embodiments, entropy coder 718 may also provide a bit-count (btcnt) to QR Codebook Filter Encoder 750.

Figure 8:
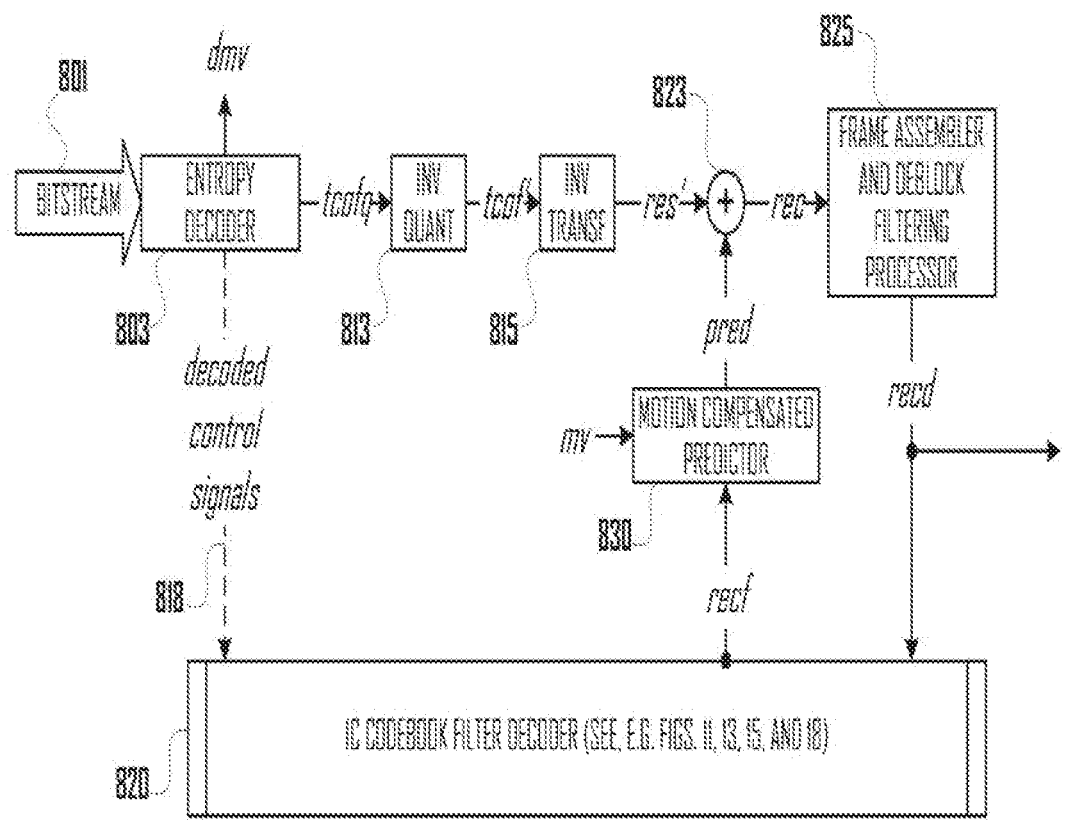
FIG. 8 illustrates a video decoder including a QR Codebook Filter Decoder, in accordance with one embodiment.

FIG. 8 shows a corresponding decoder, and works similarly to the local decoding loop 755 at the encoder 700. Specifically, the compressed bitstream 801 to be decoded is input to the entropy decoder 803, which decodes blocks of quantized coefficients (qcf), differential motion vectors (dmv), and other data, including control signals 818, which may be provided to QR Codebook Filter Decoder 820 (see, e.g., FIGS. 11, 13, 15, and 18, discussed below). The quantized coefficient blocks (qcf) are then inverse quantized by inverse quantizer 813, resulting in de-quantized coefficients (tcof'). De-quantized coefficients (tcof') are then inverse transformed out of the frequency-domain by inverse transformer 815, resulting in decoded residual blocks (res').

Adder 823 adds motion compensated prediction blocks (pred) obtained by using corresponding motion vectors (mv). The resulting decoded video (rec) is deblock-filtered in frame assembler and deblock filtering processor 825. Just as at the encoder 800, blocks (recd) at the output of frame assembler and deblock filtering processor 825 form a frame that is processed by QR Codebook Filter Decoder 820 to quality-restored reconstructed frame (recf), which is used as the reference frame for motion-compensated predictor 830. The motion compensated predictor 830 works in a similar manner as the motion compensated predictor 730 at the encoder 700, such as it uses a similar subpel interpolator.

Figure 9:
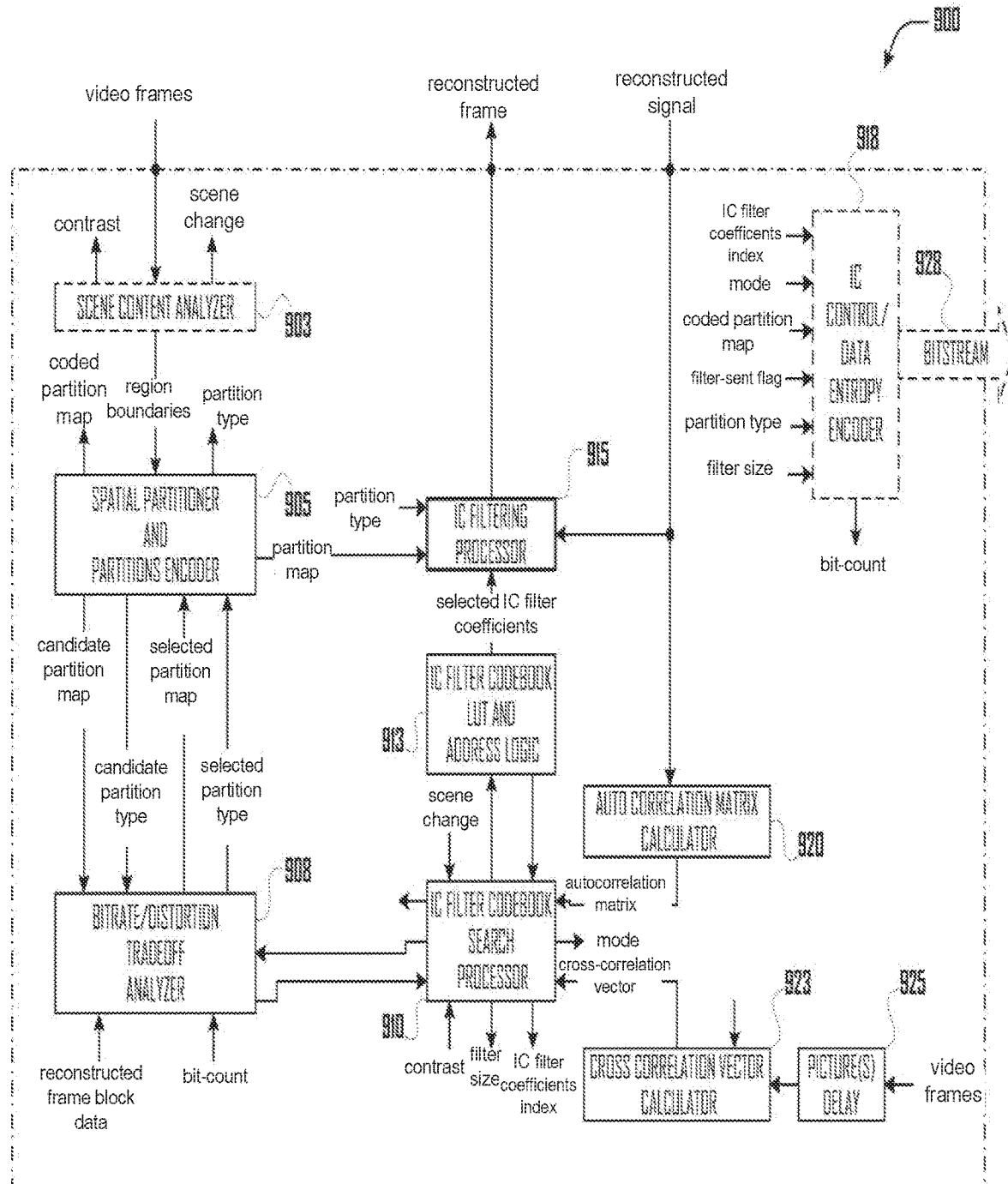
FIG. 9 illustrates a QR Codebook Filter Encoder in accordance with one embodiment.

FIG. 9 illustrates a QR Codebook Filter Encoder 900 in accordance with one embodiment. A video frame (not shown) is divided into blocks (blks), which are input one a time to Encoder 900. Also provided to Encoder 900 is reconstructed signal (recd).

Spatial Partitioner and Partitions Encoder 905 determines candidate partition map (cand. ptmap) and type (cand. pttyp), which are provided to Bitrate/Distortion Tradeoff Analyzer 908. For example, in one embodiment, candidate partition map (cand. ptmap) may comprise a binary map (if only two types of regions or blocks types exist), a trinary map (in case there are three types of regions or blocks), two binary maps, or the like.

Bitrate/Distortion Tradeoff Analyzer 908 selects a partition map (selected ptmap or simply ptmap) and partition type (selected pttyp or simply pttyp), which are returned to Spatial Partitioner and Partitions Encoder 905 and passed on to QR Filtering Processor 915. In addition, in some embodiments, partition map (ptmap) can be encoded into bitstream 928 by entropy coder 918 for transmission to a decoder. However, in its raw form (e.g., a 0/1 mask, or even multiple 0/1 masks) partition map (ptmap) may have a relatively high bit cost to transmit in raw form. Thus, in many embodiments, a compressed version of partition map (ptmap), referred to as coded partition map (ptmapc), is generated and encoded into bitstream 928 by entropy coder 918. If lossless compression is used, the decoder can decode coded partition map (ptmapc) and derive the exact partition map (ptmap) for use at the decoder. In various embodiments, the compression method used for encoding partition map (ptmap) to generate coded partition map (ptmapc) may include Huffman coding, run/length coding, arithmetic coding, or other like lossless coding technique. Furthermore, in some cases lossless compression may not sufficiently reduce the bit cost to transmit partition map (ptmap). In such cases, coded partition map (ptmapc) may be generated via a lossy compression technique.

In accordance with various embodiments, various different partitioning modes may be employed by Spatial Partitioner and Partitions Encoder 905 and/or Bitrate/Distortion Tradeoff Analyzer 908. In various embodiments, the methods described herein can be applied per frame, per region or segment, per group of slices, per single slice, per each quad-tree or bi-tree partitions of a frame, per group of macroblocks or blocks of a frame, per tile, per fragments of a tile, and/or by using tile, fragment, macroblock, or block map that may allow selection from among a number of available filters.

Figure 10A:
FIGS. 10a-f illustrate various organizations of pictures, to which various embodiments may be applied.
Figure 10B:
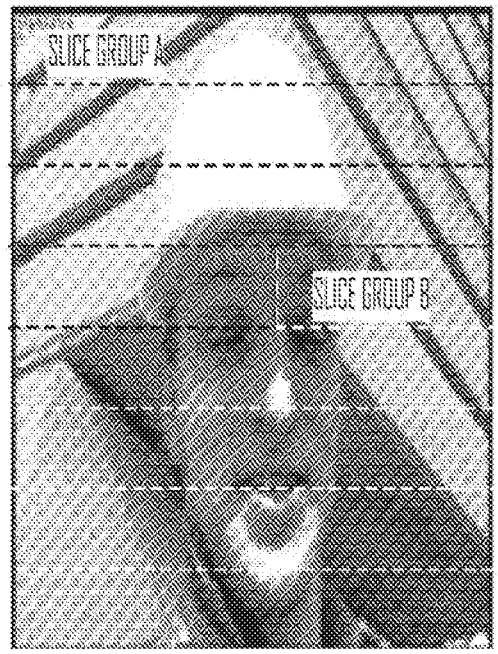
Figure 10C:
Figure 10D:
Figure 10E:
Figure 10F:

For example, FIGS. 10*a-f* illustrate various partitioning modes for dividing a picture in accordance with various embodiments. For instance, FIG. 10*a* illustrates picture-based partitioning, in which filter codes are only switched on a picture-by-picture basis. FIG. 10*b* illustrates slice or slice-group based partitioning such that a first filter set is applied on slice group 'A', and a second filter set is applied on slice group 'B'. FIG. 10*c* illustrates a block map that identifies which filter to use for block type 'A' and which filter to use for block type 'B'. FIG. 10*d* shows division of a picture into tiles and further division of tiles into bi-tree partitions such that various cuts of bi-tree based on rate-distortion optimization ("RDO") are labeled as 'A' or 'B', indicating that they may correspondingly use a first or a second filter set. Likewise, FIG. 10*e* shows partitioning of a picture into tiles, and further partitioning of a tile into two types of quad-tree partitions labeled as 'A or 'B' such that they may correspondingly use a first or a second filter set. Finally, FIG. 10*f* shows regions that result from merging of slices, or merging of blocks, or merging of bi-tree, or merging of quad-tree partitions, or purely by spatial segmentation.

Referring again to QR Codebook Filter Encoder 900 and FIG. 9, blocks (blks) are provided to Picture(s) Delay 925 and then to Cross Correlation Vector Calculator 923, which calculates cross-correlation matrix/row vector ($R_{dx}$) between source frame block data (blks) and reconstructed frame block data (recd). Auto Correlation Matrix Calculator 920 calculates autocorrelation matrix ($R_{xx}$) of reconstructed frame block data (recd).

QR Filter Codebook Search Processor 910 determines a filter size (fsz) (e.g., (e.g. 5×5, 7×7, 9×9, and the like) and mode (md) (e.g., non-symmetric or point symmetric) according to image characteristics of the input picture, such as scene change (scnchg) and contrast (contr). (See FIGS. 8*a-h*, discussed below.) For example, when the input picture is 'low contrast,' a large filter size (e.g. 9×9) may be determined. On the other hand when the input picture is 'high contrast', a small filter size (e.g. 5×5) may be determined if the coding quality is high, or a medium filter size (e.g., 7×7) if the coding quality is medium to low. For medium contrast scenes a medium filter size (e.g., 7×7) may be determined when coding quality is sufficient, or a large filter size (e.g., 9×9) when coding quality is low. In some embodiments, the filter size information is sent on a frame basis.

Using cross-correlation matrix/row vector ($R_{dx}$) and auto-correlation matrix ($R_{xx}$), QR Filter Codebook Lookup Table ("LUT") and Address Logic 913 search within the QR Filter Codebook to locate a set of QR filter coefficients (qrfc) that at least substantially fit with the computed target set of filter coefficients.

In some embodiments, the codebook search involves applying each individual set of QR filter coefficients to the entire reconstructed frame block data (recd). The winning set of filter coefficients is selected to be the set of filter coefficients that yields the smallest Sum of Absolute Differences ("SAD") in respect to the original source frame block data (blks).

In other embodiments, the codebook search involves computing a comparison metric or matching criterion, such as the mean square error ("MSE") of QR filters in the filter codebook, and selecting a set of filter coefficients that minimizes the comparison metric (e.g., MSE, SAD, and the like). For example, the calculation of MSE between two video frames, original frame pixels d(n) and filtered reconstructed frame pixels y(n) (obtained by filtering reconstructed frame pixels x(n)), involves finding sum of square of pixel by pixel difference between the two video frames and dividing by number of pixels in a video frame as follows.

$$MSE = \frac{1}{(hsz \times vsz)} \sum_n (d(n) - y(n))^2$$

$$SSE = \sum_n (d(n) - y(n))^2$$

$$SSE = \sum (d(n))^2 + \sum (y(n))^2 - 2 \sum d(n)y(n)$$

The general operation of filtering a signal x( ) using a filer h( ) resulting in filtered output y( ) can be written as:

$$y(n) = \Sigma h(k)x(n-k)$$

Substituting for y( ) in the sum of squares error ("SSE") equation, $$SSE = \Sigma(d(n))^2 + \Sigma\Sigma(h(k)x(n-k))^2 - 2\Sigma d(n)(\Sigma(h(k)x(n-k)))$$

This SSE equation is in fact same as the equation discussed during filter calculation, i.e., $$E[e^2(n)] = P_d h^T R_{xx} h - 2R_{dx}^T h$$

To find minimum SSE given a set of filters, a filter is located that results in $$\min(h^T R_{xx} h - 2R_{dx}^T h)$$

Further, the autocorrelation matrix $R_{xx}$ or the cross-correlation vector $R_{dx}$ does not depend on the filter h, and, in fact, both the $R_{xx}$ and the $R_{dx}$ were calculated earlier (during calculation of the best QR filter) for a given frame and thus can be reused.

Comparing the complexity of a correlation based approach to SSE calculation versus direct calculation of SSE (in terms of multiply operations), the complexity of actual filtering is of the order of hsz×vsz×taps (e.g., for CIF video and 81 tap filtering, 352×288×81=8,211,456), whereas the complexity of correlation approach is of the order of taps×taps+taps (e.g., for CIF video and 81 tap filtering, 81×81+81=6642, or over 1000 times less than that of actual filtering).

Referring again to FIG. 9, QR Filter Codebook LUT and Address Logic 913 therefore search within the QR Filter Codebook to locate a set of QR filter coefficients (qrfc) that minimize MSE (or other matching criterion). The index (qrfci) of the located set of QR filter coefficients (qrfc), as well as the determined filter size (fsz) and mode (md), is provided to entropy encoder 918 for inclusion in bitstream 928. Using the located set of QR filter coefficients (qrfc), QR Filtering Processor 915 filters at least a portion of the reconstructed signal (recd), as indicated by partition map (ptmap) and partition type (pttyp), to a quality-restored reconstructed signal (reef) that is objectively more faithful to the original source signal (represented by source frame block data (blks)) than the non-quality-restored reconstructed signal (recd).

Figure 11:
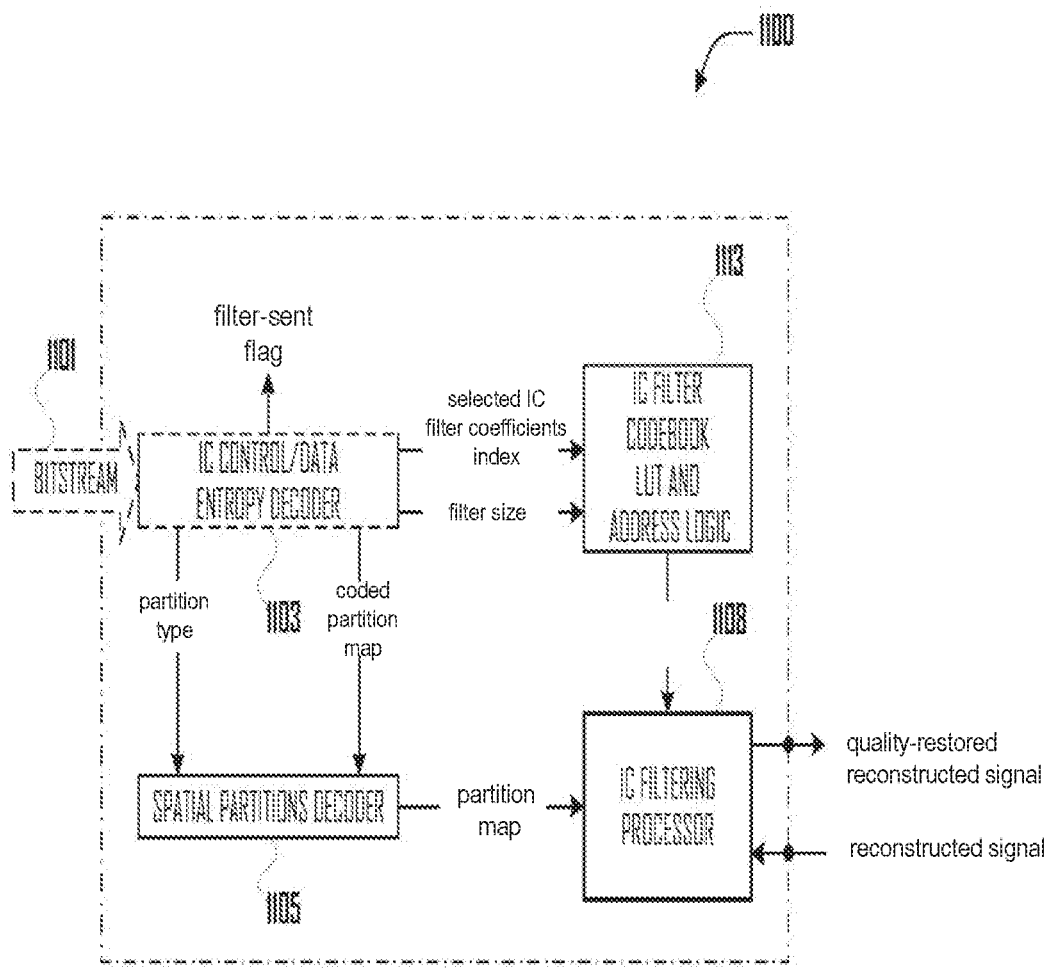
FIG. 11 illustrates a QR Codebook Filter Decoder in accordance with one embodiment.

FIG. 11 illustrates a QR Codebook Filter Decoder 1100 corresponding to Encoder 900, discussed above. Compressed bitstream 1101 to be decoded is input to the entropy decoder 1103, which decodes coded partition map (ptmapc), partition type (pttyp), a filter size (fsz), and an index (qrfci) to a set of QR filter coefficients in a codebook of size fsz.

Coded partition map (ptmapc) and partition type (pttyp) are provided to Spatial Partitions Decoder 1105, which decodes coded partition map (ptmapc) and provides decoded partition map (ptmap) to QR Filtering Processor 1108.

Filter size (fsz) and index (qrfci) are provided to QR Filter Codebook LUT and Address Logic 1113, which obtains QR filter coefficients (qrfc) from the codebook and provides QR filter coefficients (qrfc) to QR Filtering Processor 1108. QR Filtering Processor 1108 applies QR filter coefficients (qrfc) to reconstructed signal (recd), generating an quality-restored reconstructed signal (reef).

Figure 12:
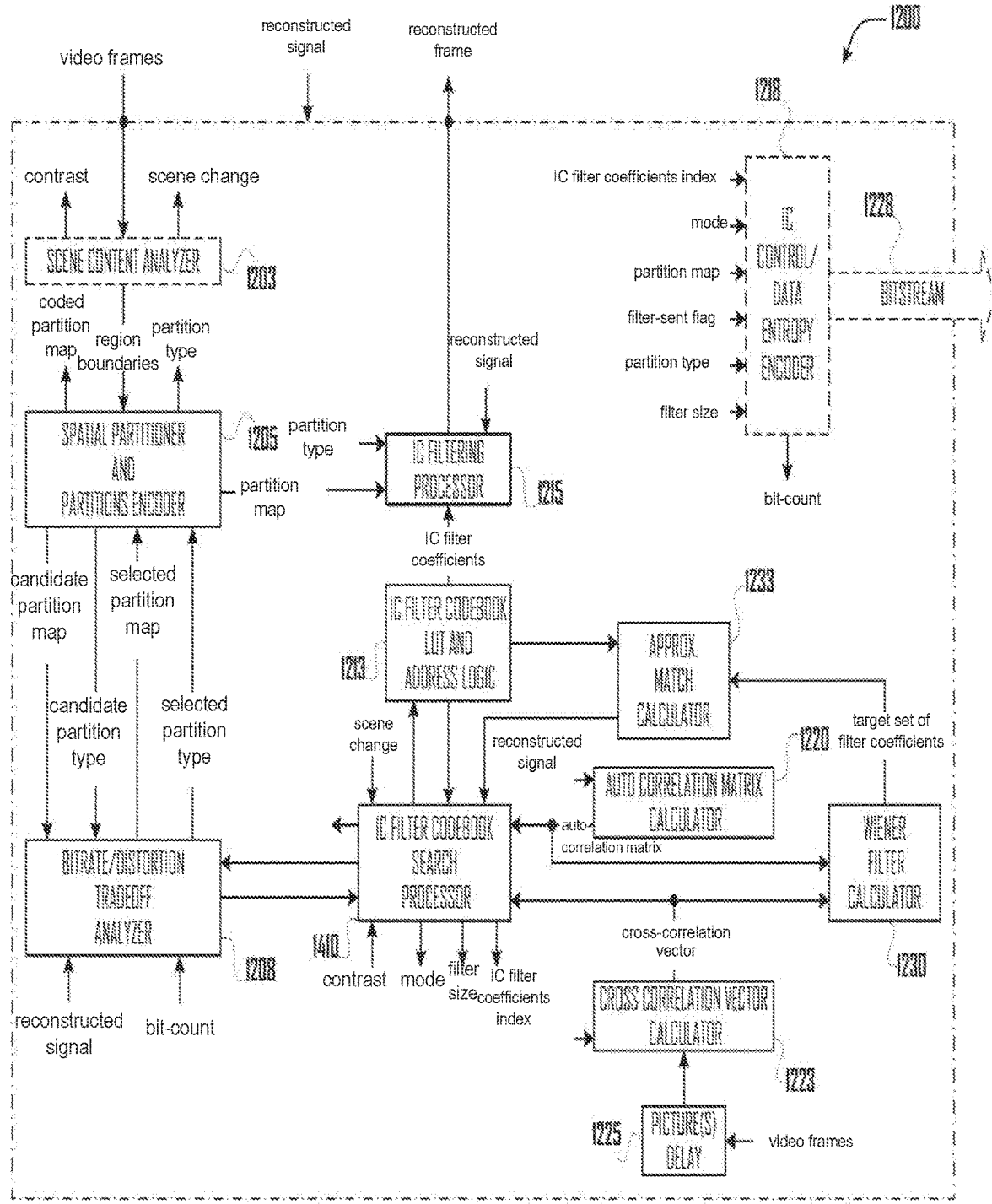
FIG. 12 illustrates a fast QR Codebook Filter Encoder in accordance with one embodiment.

FIG. 12 illustrates a fast QR Codebook Filter Encoder 1200 in accordance with one embodiment. QR Codebook Filter Encoder 1200 is similar in many respects to QR Codebook Filter Encoder 900, discussed above. However, unlike QR Codebook Filter Encoder 900, Wiener Filter Calculator 1230 uses cross-correlation matrix/row vector ($R_{dx}$) and autocorrelation matrix ($R_{xx}$) to compute a target set of filter coefficients (calc. qrfc) for a Wiener filter of the given filter size (fsz) and mode (md). Approximate Match Calculator 1233 uses the target Wiener filter coefficients (calc. qrfc) to locate within the QR Filter Codebook a set of QR filter coefficients that approximately match the computed target set of filter coefficients (calc.qrfc). For example, in one embodiment, the approximately matching set of QR filter coefficients is determined to be the set of coefficients having the closest representative coefficient, such as a center coefficient, to that of the target set of filter coefficients (calc.qrfc). In one embodiment, the search for the closest center coefficient is performed via a binary search algorithm, as sets of coefficients in the QR Filter Codebook are sorted according to center coefficient.

Once Approximate Match Calculator 1233 has located the approximately matching set of QR filter coefficients, QR Filter Codebook Search Processor 1210 determined a neighborhood radius R (e.g. 8 or 16), which is used to select a comparison group of 2R+1 sets of filter coefficients including R filters before and R filters after the approximately matching set of QR filter coefficients in the QR Filter Codebook.

QR Filter Codebook Search Processor 1210 then searches the neighborhood comparison group to determine a set of QR filter coefficients (qrfc) that minimize MSE (or SAD, or other matching criterion). In some embodiments, QR Filter Codebook Search Processor 1210 further searches up to eight possible variations (rotations and flips or mirrorings) of each set of filter coefficients in the neighborhood comparison group.

Once a good set of QR filter coefficients (qrfc) are located, the index (qrfci) (as well as the determined filter size (fsz) and mode (md)) is provided to entropy encoder 1218 for inclusion in bitstream 1228 (along with one or more additional bitstream descriptors illustrated in FIG. 19, discussed below).

Figure 13:
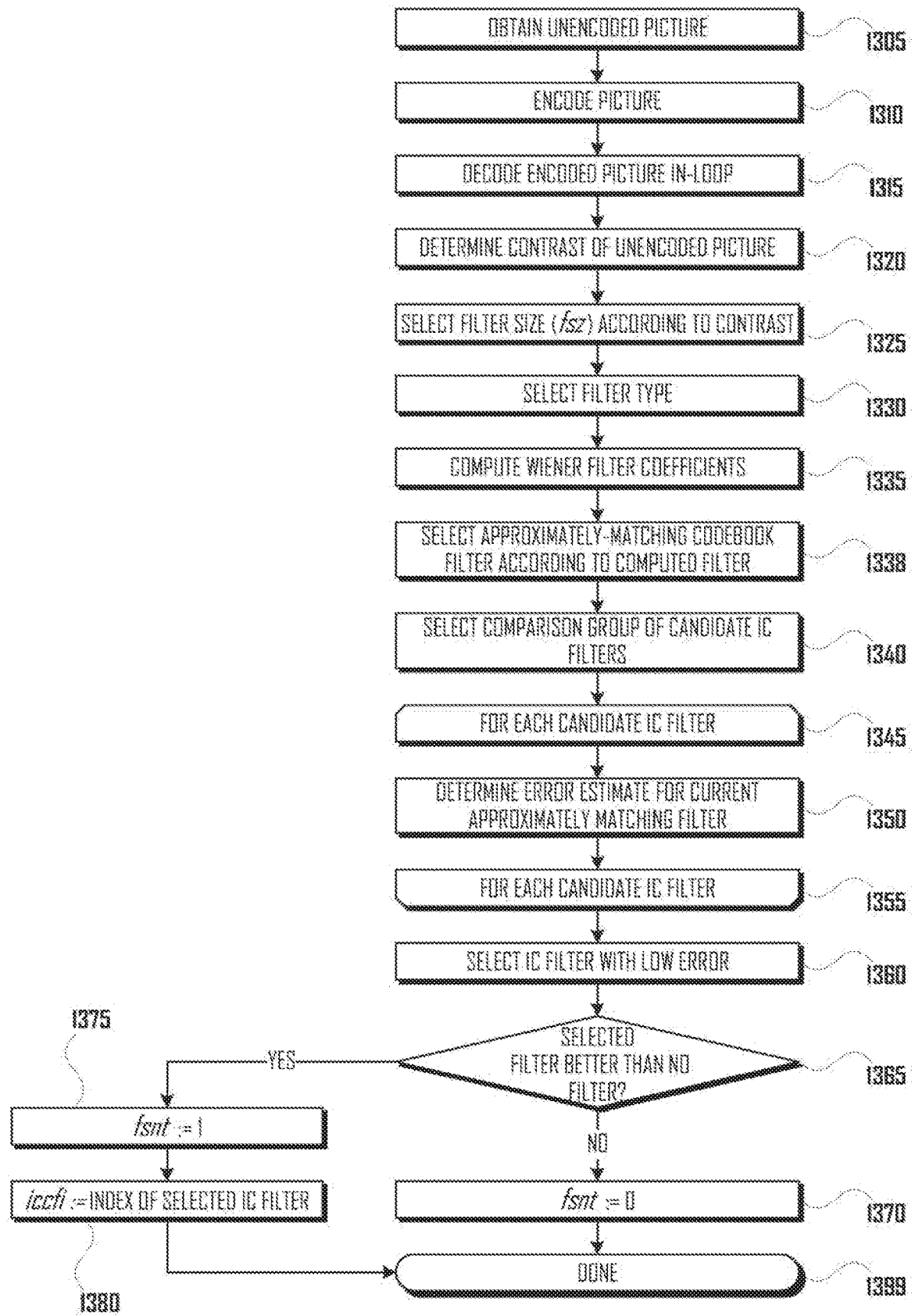
FIG. 13 illustrates a QR filter Codebook search routine, such as may be performed by an encoder in accordance with one embodiment.

FIG. 13 illustrates a QR Filter Codebook search routine 1300, such as may be performed by an encoder in accordance with one embodiment. In block 1305, routine 1300 obtains an unencoded picture or frame of video. In block 1310, routine 1300 encodes the picture at a certain bitrate with a video encoder. In some embodiments, the video encoder may be an interframe encoder. In other embodiments, the video encoder may be an intraframe encoder. In block 1315, routine 1300 locally decodes the encoded picture at the video encoder via an in-loop local decoder.

In block 1320, routine 1300 determines the contrast (e.g., low, medium, or high) of the original, unencoded picture. In block 1325, routine 1300 selects a filter size (fsz) according to the determined contrast. For example, in one embodiment, routine 1300 may select a small filter size (e.g., 5×5) when the contrast is high, a medium or large filter size (e.g., 7×7 or 9×9) when the contrast is low, and a large filter size (e.g., 9×9) otherwise.

In block 1330, routine 1300 selects a filter type (e.g., non-symmetric or symmetric) according to some or all of the encoding bitrate, the determined contrast, or other like factors.

In block 1335, routine 1300 computes coefficients for a target Wiener filter of the selected size (fsz) of the locally decoded picture with regard to the original picture, using the locally decoded picture as the reference signal and the original unencoded picture as the desired signal. In block 1340, routine 1300 selects a comparison group including one or more candidate QR Filters from a codebook. In some embodiments, the one or more candidate QR Filters may be selected by locating an approximately-matching filter from the codebook (e.g., the QR Filter having a close or the closest center coefficient to that of the target Wiener filter), and then selecting several (e.g., 8 or 16) neighboring filters on either side of the approximately-matching filter. In some embodiments, the neighborhood comparison group may further include one or more variations or transformations of each of the candidate QR Filters. For example, non-symmetric filters have four rotation variations and four mirroring variations, while symmetric filters have four rotation variations.

Beginning in opening loop block 1345, routine 1300 processes each of the one or more candidate QR filters, determining in block 1350 an error estimate (e.g., SAD, MSE, or the like) for the current candidate QR filter, and looping back from block 1355 to process the next candidate QR filter (if any). In block 1360, routine 1300 selects the candidate QR filter having a low determined error estimate. In some embodiments, routine 1300 may select the candidate QR filter having the lowest determined error estimate.

In decision block 1365, routine 1300 determines whether the selected QR filter represents an improvement compared to no QR filter. For example, in one embodiment, routine 1300 determines whether the error estimate (e.g., SAD, MSE, or the like) of the decoded picture after QR filtering with the selected QR filter (compared to the original unencoded picture) is lower than an error estimate of the decoded picture with no QR filtering. If the selected QR Filter does not provide an improvement, then in block 1370, a one-bit filter-sent flag (fsnt) in the encoded bitstream is set to 0. On the other hand, if the selected QR Filter provides an improvement, then in block 1375, the one-bit filter-sent flag (fsnt) in the encoded bitstream is set to 1, and in block 1380, an index of the selected QR filter from the codebook (qrfci) is set in the encoded bitstream. In some embodiments, routine 1300 may further set a signal (flt_ornt) (not shown) indicating a variation or transformation of the selected QR filter (e.g., indicating a rotation or mirroring variation on the selected QR filter). (See FIG. 19, discussed below, for a more detailed explanation of bitstream syntax.) Routine 1300 ends in block 1399.

Figure 14:
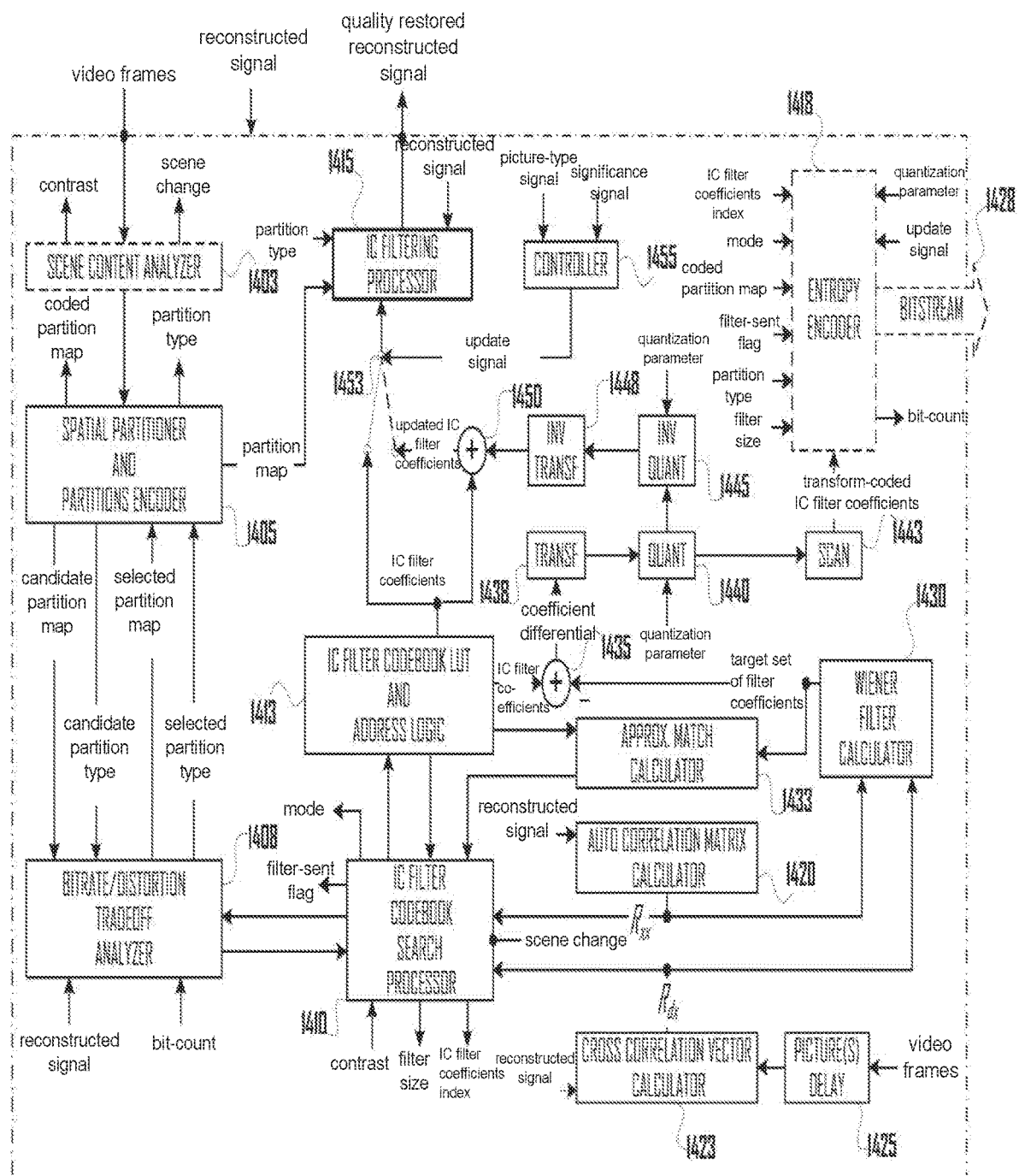
FIG. 14 illustrates a fast QR Codebook Filter Encoder with a spectral update encoder, in accordance with one embodiment.

FIG. 14 illustrates a fast QR Codebook Filter Encoder 1400 with a spectral update encoder, in accordance with one embodiment. QR Codebook Filter Encoder 1400 is similar in many respects to fast QR Codebook Filter Encoder 1200, discussed above. However, unlike QR Codebook Filter Encoder 1200, QR Codebook Filter Encoder 1400 is able to spectrally encode updates to the QR filter coefficients (qrfc) selected by QR Filter Codebook LUT and Address Logic 1413, as follows.

Wiener Filter Calculator 1430 uses cross-correlation matrix/row vector ($R_{dx}$) and autocorrelation matrix ($R_{xx}$) to compute a target set of filter coefficients (calc. qrfc) for a Wiener filter of the given filter size (fsz) and mode (md). As in QR Codebook Filter Encoder 1200, Approximate Match Calculator 1433 uses the target Wiener filter coefficients (calc.qrfc) to locate within the QR Filter Codebook a set of QR filter coefficients that approximately match the computed target set of filter coefficients (calc.qrfc).

However, unlike QR Codebook Filter Encoder 1200, Wiener Filter Calculator 1430 also provides target Wiener filter coefficients (calc.qrfc) to differencer 1435, where they are differenced with corresponding selected QR filter coefficients (qrfc).

After differencing at differencer 1435, the resulting coefficient differential (qrfcd) adjustment values are forward transformed to a frequency-domain representation by transformer 1438, resulting in a block of transformed differential coefficients that is then sent to the quantizer 1440. Quantizer 1440 quantizes the block of transformed differential coefficients according to a quantization parameter (qp, also sometimes referred to as quantization scale) into a block of quantized transformed differential coefficients that are sent both to scanner 1443 and to inverse quantizer 1445. Scanner 1443 scans the block of quantized transformed differential coefficients according to a reverse-scanning order (see FIG. 16a, discussed below) and provides the scanned transform-coded differential coefficients (tcod.qrcof) to entropy encoder 1418 for encoding into bitstream 1428 if indicated by update signal (updt) (discussed below).

Inverse quantizer 1445 de-quantizes the block of quantized transformed differential coefficients according to quantization parameter (qp) and sends the de-quantized transformed differential coefficients to the inverse transformer 1448. At adder 1450, the inverse-transformed de-quantized differential coefficients are added to the selected QR filter coefficients (qrfc) from QR Filter Codebook LUT and Address Logic 1413 to form updated QR filter coefficients (qrfcu).

Controller 1455 sends an update signal (updt) to Switch 1453, indicating whether Switch 1453 should send to QR Filtering Processor 1415 either the selected QR filter coefficients (qrfc) or updated QR filter coefficients (qrfcu). To determine update signal (updt), Controller 1455 uses picture-type signal (pictyp) (e.g., I-, P-, or B-picture types) and significance signal (sigf). Significance signal (sigf) is a thresholding choice made at QR Codebook Filter Encoder 1400 that indicates whether the difference between selected QR filter coefficients (qrfc) and the target QR filter coefficients (calc.qrfc) exceeds a pre-determined significance threshold. If the difference exceeds the threshold, then update signal (updt) indicates to Switch 1453 that updated QR filter coefficients (qrfcu) should be used by QR Filtering Processor 1415. In addition, update signal (updt) is also encoded to bitstream 1428 by entropy coder 1418.

Figure 15:
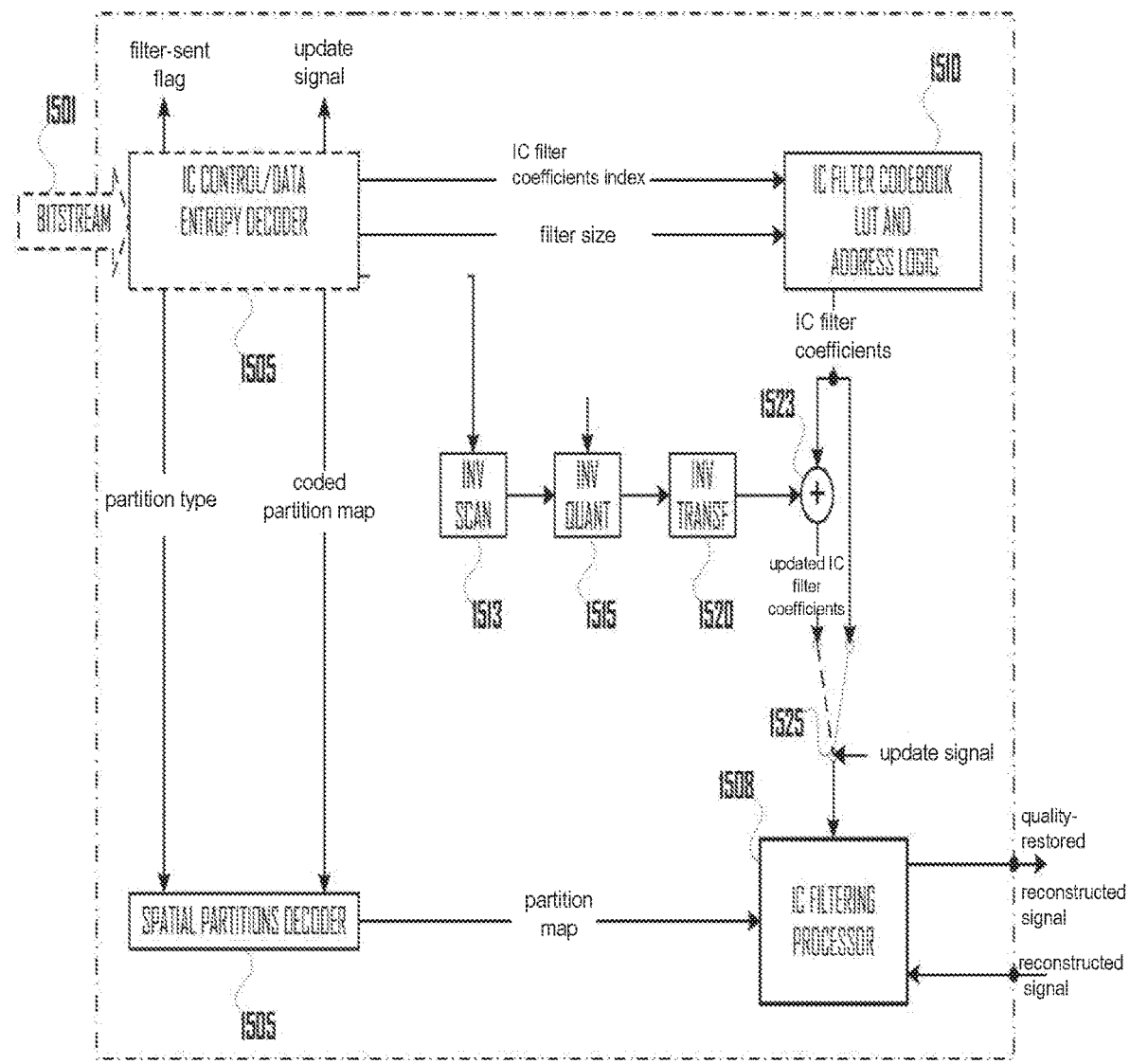
FIG. 15 illustrates a QR Codebook Filter Decoder in accordance with one embodiment.

FIG. 15 illustrates a QR Codebook Filter Decoder 1500 corresponding to QR Codebook Filter Encoder 1400, discussed above. Compressed bitstream 1501 is input to the entropy decoder 1503, which decodes coded partition map (ptmapc), partition type (pttyp), a filter size (fsz), an update signal (updt), scanned transform-coded differential coefficients (tcod.qrcof), and an index (qrfci) to a set of QR filter coefficients in a codebook of sizefsz.

Coded partition map (ptmapc) and partition type (pttyp) are provided to Spatial Partitions Decoder 1505, which decodes coded partition map (ptmapc) and provides decoded partition map (ptmap) to QR Filtering Processor 1508.

Filter size (fsz) and index (qrfci) are provided to QR Filter Codebook LUT and Address Logic 1510, which obtains QR filter coefficients (qrfc) from the codebook.

Inverse Scanner 1513 inverse-scans scanned differential transform-coded coefficients (tcod.qrcof) according to a reverse-scanning order (see FIG. 16a, discussed below) to obtain a block of quantized transformed differential coefficients. Inverse quantizer 1515 de-quantizes the block of quantized transformed differential coefficients according to quantization parameter (qp) and sends the de-quantized transformed differential coefficients to the inverse transformer 1520. At adder 1523, the inverse-transformed de-quantized differential coefficient adjustment values are added to the selected QR filter coefficients (qrfc) to form updated QR filter coefficients (qrfcu).

Switch 1525 determines (according to update signal (updt)) whether to provide the selected QR filter coefficients (qrfc) or updated QR filter coefficients (qrfcu) to QR Filtering Processor 1508. QR Filtering Processor 1508 applies the provided coefficients to reconstructed signal (recd), generating an quality-restored reconstructed signal (reef).

Figure 16A:
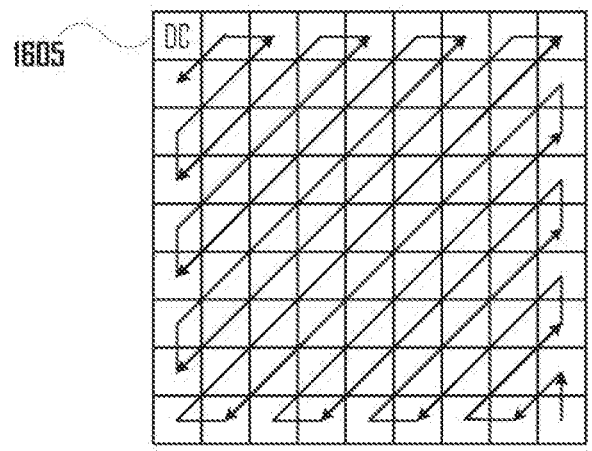
FIGS. 16a-b illustrate an exemplary transform coefficient scanning and mask used by various embodiments.

FIG. 16a illustrates an exemplary transform coefficient reverse scanning used by QR Codebook Filter Decoder 1500 and QR Codebook Filter Encoder 1400. Generally speaking, transform coefficients are often scanned in a zigzag order beginning with a DC coefficient (e.g., 1605). However, in the illustrated reverse-scanning, transform coefficients may be scanned in a zigzag order ending with DC coefficient 1605.

Figure 16B:
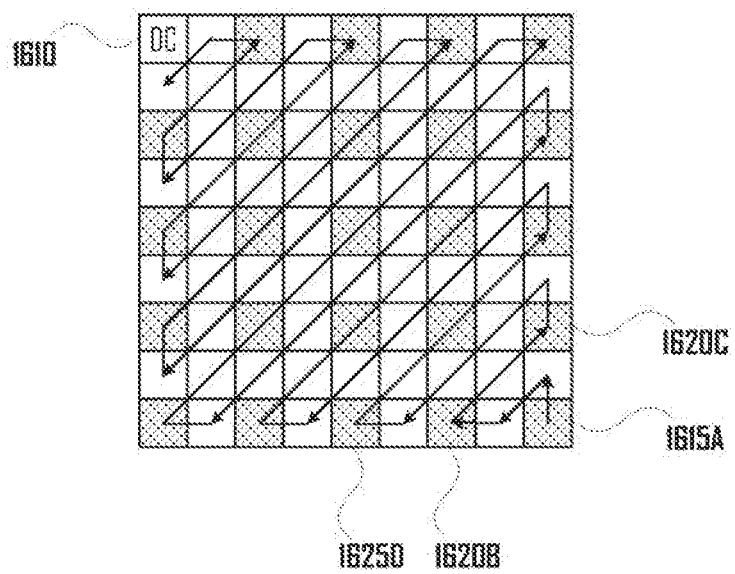

FIG. 16b illustrates an exemplary transform mask that may be used in connection with coefficient reverse scanning used by QR Codebook Filter Decoder 1800 and QR Codebook Filter Encoder 1700. As illustrated in FIG. 16b, a coefficient mask (depicted in shaded cells 1615A-D and the other 20 unlabeled shaded cells) may be employed to indicate AC transform coefficients to include (or, alternately, to be omitted) when scanning in a zigzag order ending towards DC coefficient 1605.

Figure 17:
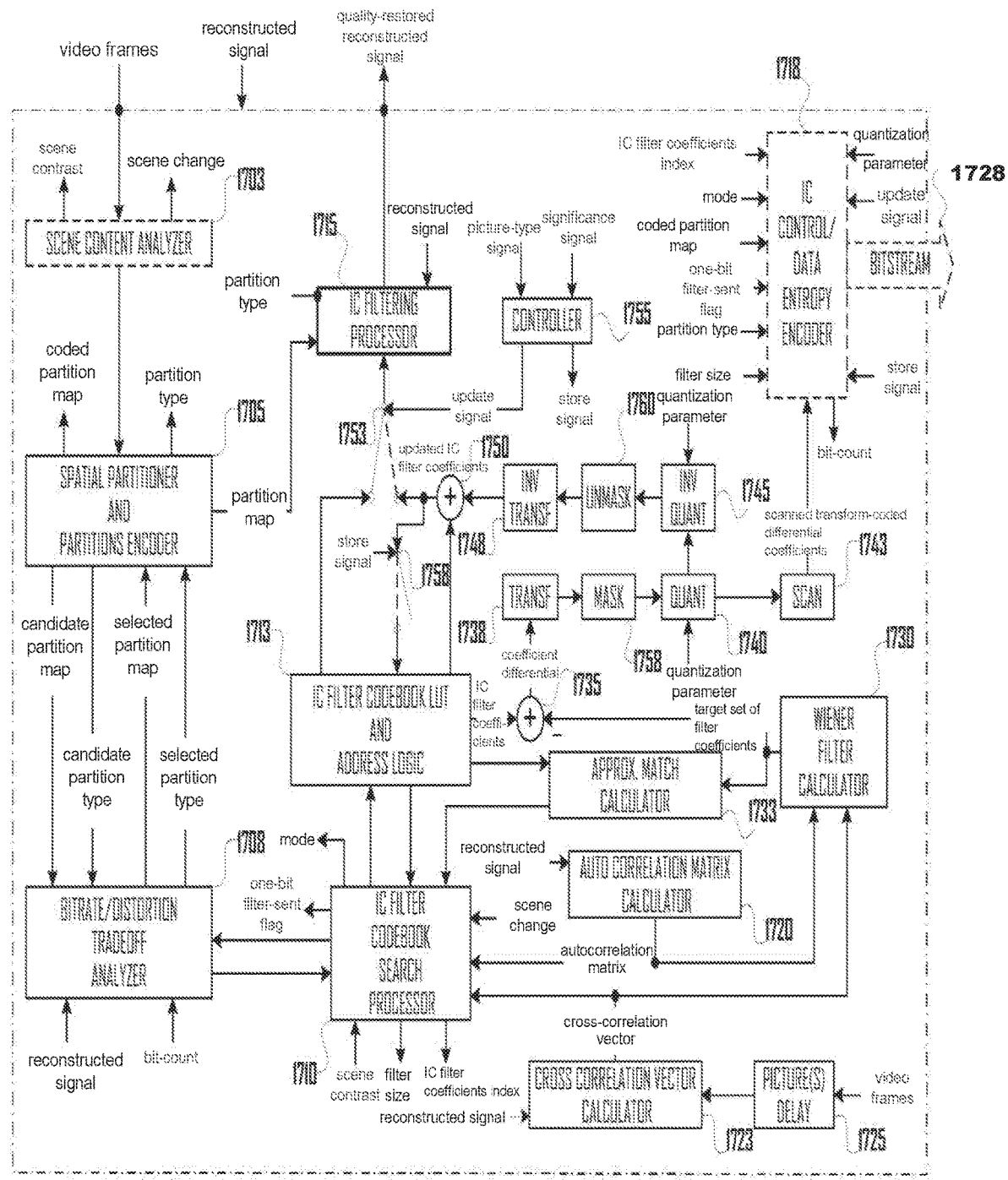
FIG. 17 illustrates a fast QR Codebook Filter Encoder with a spectral update encoder and updatable codebook, in accordance with one embodiment.

FIG. 17 illustrates a fast QR Codebook Filter Encoder 1700 with a spectral update encoder and updatable codebook, in accordance with one embodiment. QR Codebook Filter Encoder 1700 is similar in many respects to QR Codebook Filter Encoder 1400, discussed above. However, unlike QR Codebook Filter Encoder 1400, QR Codebook Filter Encoder 1700 is able to store updated QR filter coefficients (qrfcu) in the codebook as follows. Controller 1755 indicates that the codebook should be updated to store updated QR filter coefficients (qrfcu) via store signal (str). Store signal (str) is used by Switch 1758 to determine whether to store updated QR filter coefficients (qrfcu) in the codebook. Store signal (str) is also encoded by entropy encoder 1718 to bitstream 1728. In some embodiments, Controller 1755 may also indicate a codebook reset signal (not shown) indicating that stored updates should be discarded, the codebook reverting to its standard form (e.g., at a scene change).

QR Codebook Filter Encoder 1700 also differs from QR Codebook Filter Encoder 1400 in that transform coefficient mask (see FIG. 16b, discussed above) is used after transforming operations (mask 1758) and before inverse transforming operations (unmask 1760).

Figure 18:
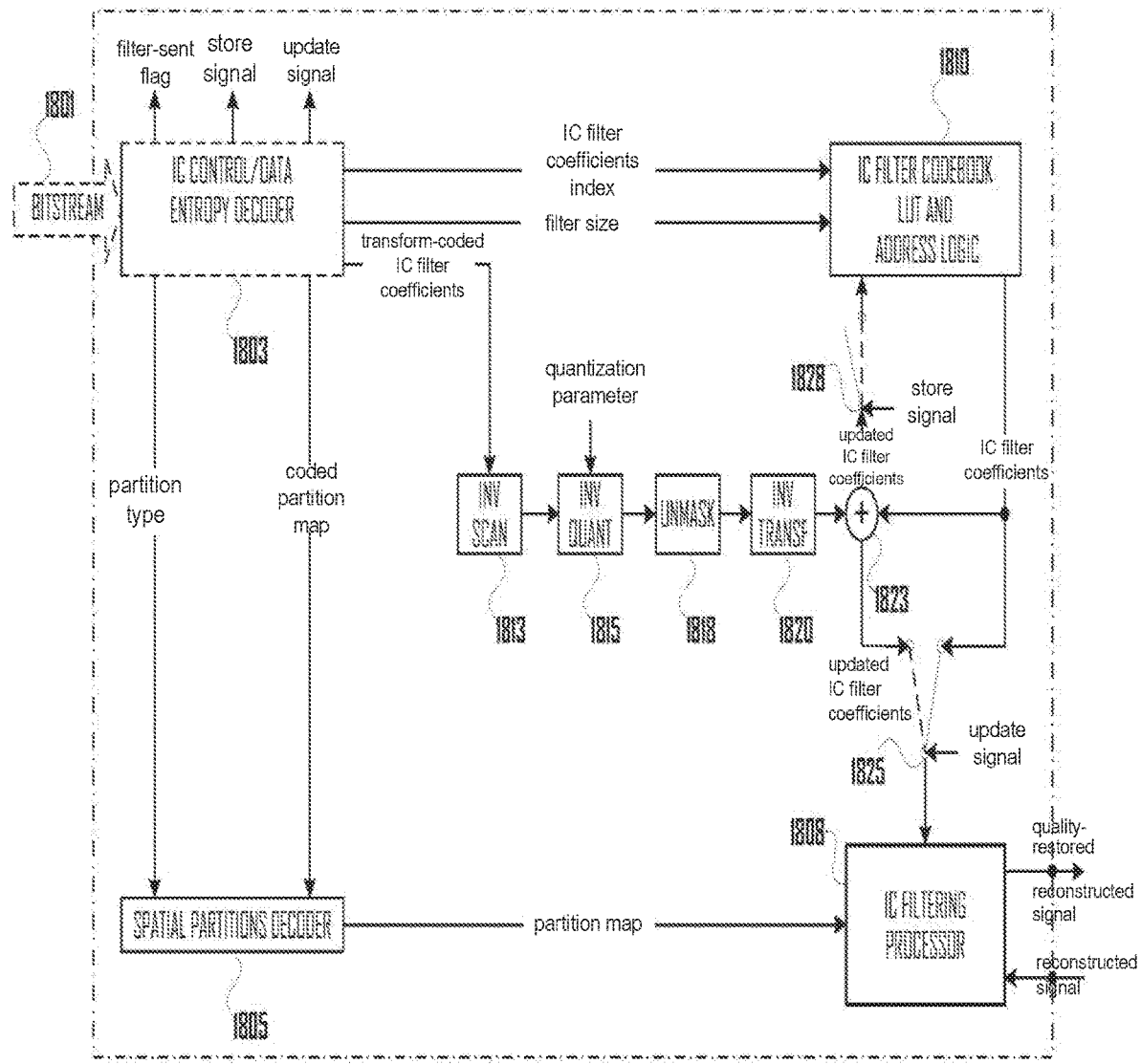
FIG. 18 illustrates a QR Codebook Filter Decoder in accordance with one embodiment.

FIG. 18 illustrates a QR Codebook Filter Decoder 1800 corresponding to QR Codebook Filter Encoder 1700, discussed above. Filter Decoder 1800 is similar in many respects to QR Codebook Filter Decoder 1500, discussed above. However, unlike QR Codebook Filter Decoder 1500, QR Codebook Filter Decoder 1800 is able to store updated QR filter coefficients (qrfcu) in the codebook as follows. Store signal (str) is decoded by entropy decoder 1803 from bitstream 1801. Store signal (str) is used by Switch 1758 to determine whether to store updated QR filter coefficients (qrfcu) in the codebook. In some embodiments, entropy decoder 1803 may also decode a codebook reset signal (not shown) indicating that stored updates should be discarded, the codebook reverting to its standard form.

Figure 19:
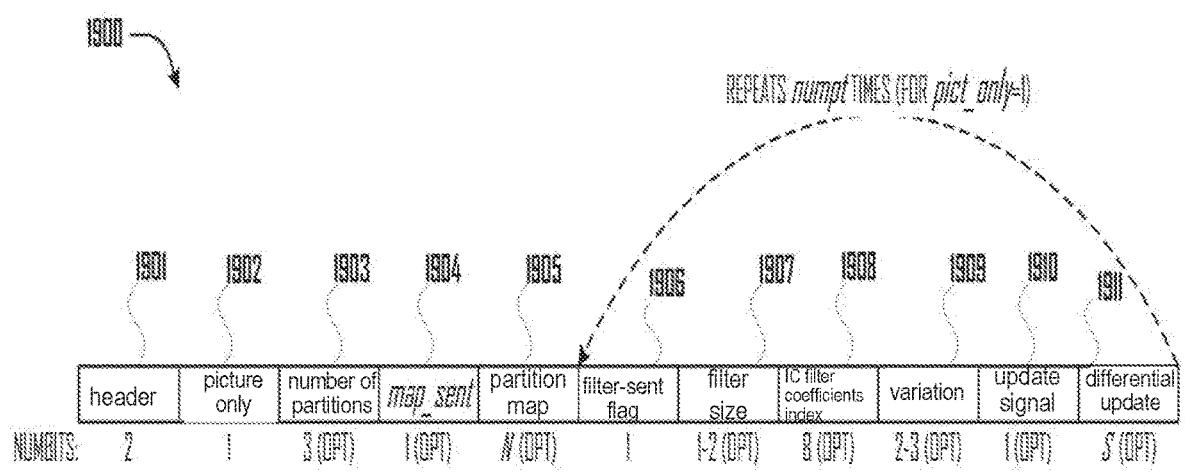
FIG. 19 illustrates an exemplary bitstream syntax for QR Codebook Filter encoders and decoders in accordance with various embodiments.

FIG. 19 illustrates an exemplary bitstream syntax 1900 for QR Codebook Filter encoders and decoders and variously described herein. Bitstream syntax 1900 begins with 2-bit header cqrf_hdr 1901. One-bit pict_only flag 1902 indicates whether a single QR Filter is specified for the entire picture. Optional 3-bit numpt field 1903 indicates a number of partitions (up to eight). Optional 1-bit map_sent flag 1904 indicates whether a partition map is sent to indicate where the filter is applied or not, or alternatively, to switch between multiple filters. Optional n-bit ptmap field 1905 includes the partition map (if any).

One-bit fsnt flag 1906 indicates whether a QR Filter is included in the bitstream. If flag 1906 is set, then optional 1- or 2-bit field fsz 1907 indicates a filter size (e.g., 5×5, 7×7, or 9×9) of the included QR Filter, followed by a codeword for the selected filter. The codeword includes 8-bit qrfci field 1908 (an index into a codebook of QR Filters) and 2-bits (separable filters) or 3-bits (non-separable filters) in flt_ornt field 1909 indicating the filter's variation or transformation that should be applied to the coefficients indicated by index qrfci 1908 (e.g., one of four rotations for separable filters, or one of four rotations and four mirrorings for non-separable filters). Optional 1-bit updt flag 1910 indicates whether the bitstream includes a differential update to the coefficients indicated by index qrfci 1908. Optional s-bit updt_dat field 1911 includes a differential update to be applies to the coefficients indicated by index qrfci 1908. When indicated by pict_only flag 1902, fields 1906-1911 repeat numpt 1903 times.

Figure 20A:
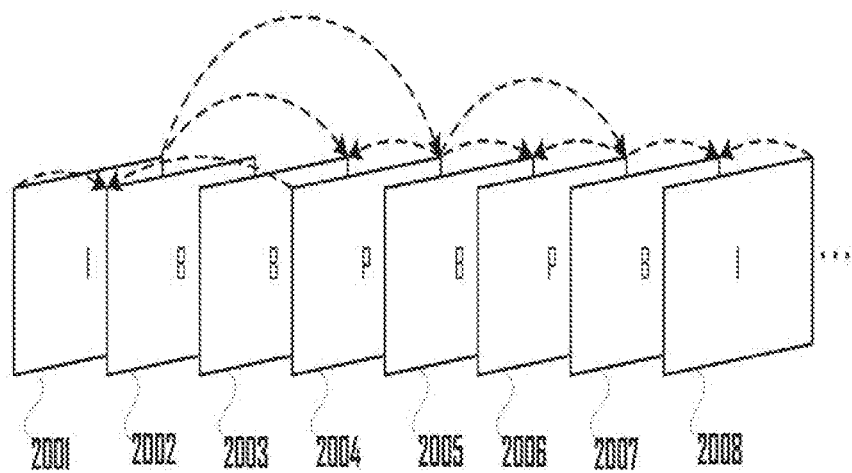
FIGS. 20a-b illustrates a sequence of pictures or frames within a video stream, in accordance with various embodiments.
Figure 20B:
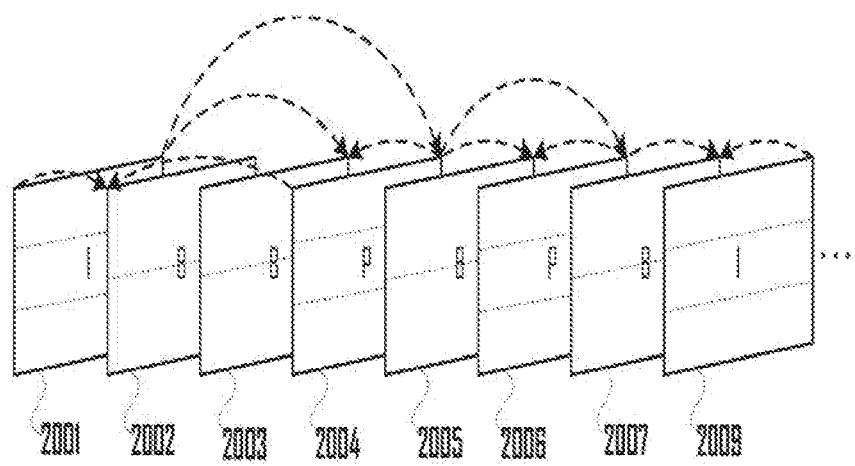

FIG. 20a illustrates a sequence of pictures or frames 2001-2008 within a video stream, including I-frames 2001, 2008, P-frames 2004, 2006, and B-frames 2002-2003, 2005, 2007. FIG. 20b illustrates a sequence of pictures or frames 2001-2008 within a video stream, including I-frames 2001, 2008, which are partitioned into three exemplary partitions (numpt=3); P-frames 2004, 2006, which are partitioned into three exemplary partitions (numpt=3); and B-frames 2002-2003, 2005, 2007, which are partitioned into two exemplary partitions (numpt=2). Table 1 indicates an exemplary coding bit cost for encoding QR Codebook Filters according to various combinations of picture type and number of partitions (numpt). (The exemplary coding bit costs shown in Table 1 exclude bit costs for spatial partition maps such as regions, slices, tiles or tile fragments, picture bi-tree or quad-tree, tile bi-tree or quad-tree, and/or merged blocks.)

TABLE 1

| Picture Type (and QR filtering mode) | Number of Filter Sets and Approx. Coding bits cost | | | | | | | |
|---|---|---|---|---|---|---|---|---|
| | numpt = 1 | | numpt = 2 | | numpt = 3 | | numpt = 4 | |
| | Num Filt. | Approx. Bits cost | Num Filt. | Approx. Bits cost | Num Filt. | Approx. Bits cost | Num Filt. | Approx. Bits cost |
| I (no update) | 1 | 16 | 2 | 33 | 3 | 46 | 4 | 59 |
| P (no update) | 1 | 16 | 2 | 33 | 3 | 46 | 4 | 59 |
| B (no update) | 1 | 16 | 1 | 16 | 2 | 33 | 2 | 33 |

Figure 21:
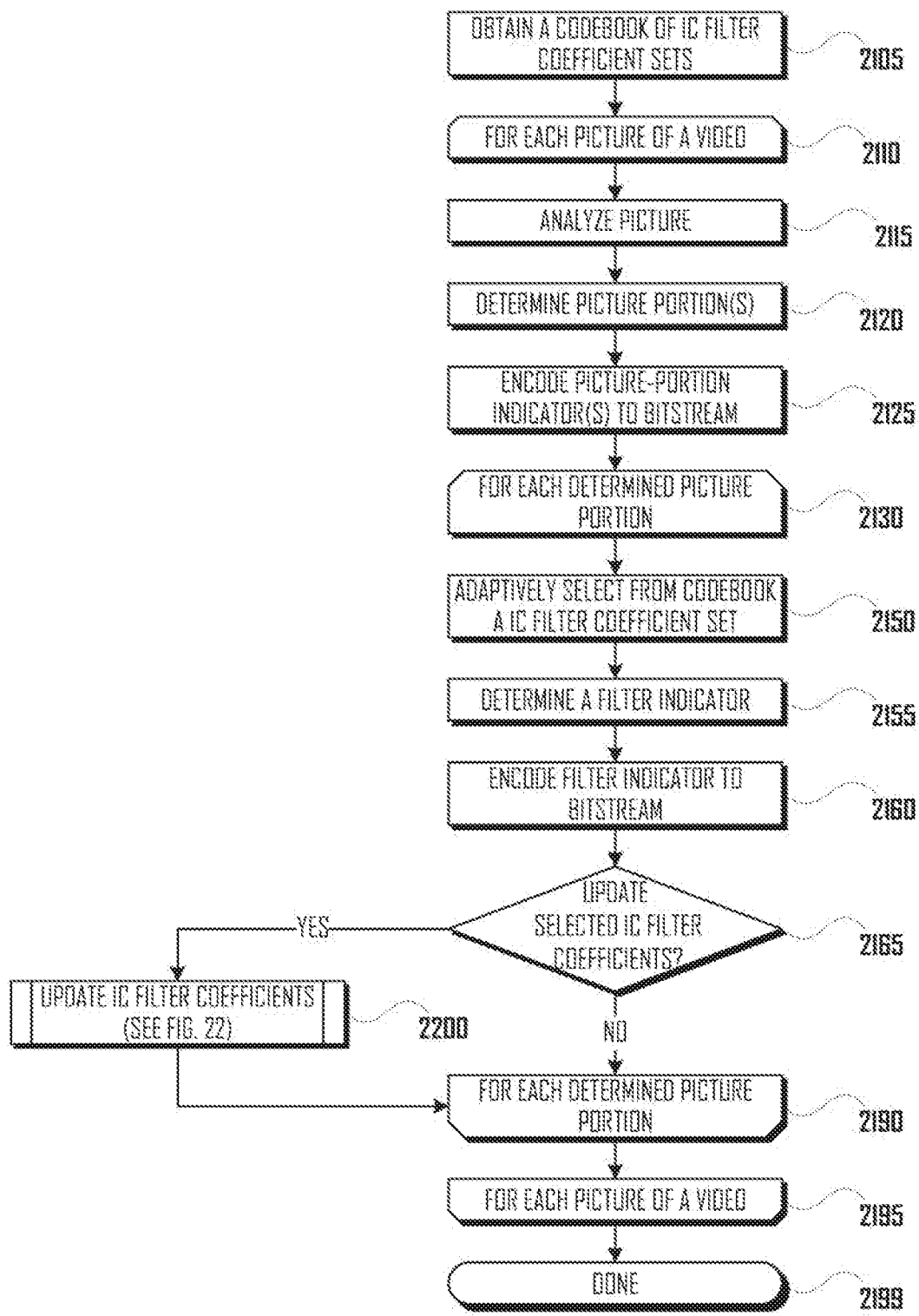
FIG. 21 illustrates a routine for encoding a QR filter for a picture of a video into a bitstream using a codebook, in accordance with one embodiment.

FIG. 21 illustrates a routine 2100 for encoding a QR filter for a picture of a video into a bitstream using a codebook, in accordance with one embodiment. In block 2105, routine 2100 obtains a codebook including a plurality of sets of QR filter coefficients suitable for configuring a quality restoration filter of a video decoder to process frames of encoded videos having a variety of characteristics (e.g., high contrast, low contrast, and the like). In one embodiment, the codebook may include 256 sets of filter coefficients, sorted according to a representative coefficient (e.g., sorted according to center coefficient). Other embodiments may include smaller or larger codebooks, sorted according to different criteria.

Beginning in starting loop block 2110, routine 2100 processes each picture or frame of a video. In block 2115, routine 2100 analyzes the current picture. For example, in one embodiment, routine 2100 may determine one or more image characteristics, such as a contrast level and/or whether the current picture represents a scene change compared to a previous picture.

In block 2120, routine 2100 determines one or more portions of the current picture. For example, FIG. 10*a-f*, discussed above, illustrate various exemplary portions into which a picture may be divided, according to various embodiments. In some embodiments, the number of portions that routine 2100 determines may be determined, at least in part, according to a picture type of the current picture. (See, e.g., FIG. 20*b*, discussed above.)

In block 2125, routine 2100 encodes one or more picture-portion indicators to a bitstream. For example, in one embodiment, routine 2100 may encode one or more of fields 1902-1905, as illustrated in FIG. 19 and discussed above.

Beginning in starting loop block 2130, routine 2100 processes each of the one or more determined picture portions. In block 2150, routine 2100 adaptively selects a set of QR coefficients from the codebook to improve how faithfully the video decoder reproduces the current picture-portion when the set of QR coefficients is used to configure the decoder's quality restoration filter to process the current picture-portion. FIGS. 12, 14, and 17, discussed above, illustrate various methods of adaptively selecting a set of QR coefficients from the codebook. For example, in one embodiment, adaptively selecting the set of QR coefficients may include some or all of encoding the unencoded picture, decoding the encoded picture in a local decoder loop; computing a target set of QR filter coefficients according to the decoded picture and the unencoded picture, and selecting from the codebook a set of QR filter coefficients that substantially fits with the target set of QR filter coefficients. In some embodiments, selecting QR filter coefficients that substantially fit with the target set may include selecting an approximately-matching set of coefficients according to a representative coefficient (e.g., the center coefficient) and identifying a comparison group of QR filters neighboring the approximately-matching set of coefficients. QR filters in the comparison group (including zero or more variations of each) may then be scored by determining error estimates (e.g., MSE), with the lowest-scoring set of QR filter coefficients being selected.

In block 2155, routine 2100 determines a filter indicator, such as an index into the codebook, for the selected set of QR coefficients. In block 2160, routine 2100 encodes the filter indicator into the bitstream to enable a decoder to locate the selected set of QR coefficients from the decoder's copy of the codebook.

In decision block 2165, routine 2100 determines whether to send an update to the selected set of QR coefficients to further improve how faithfully the video decoder reproduces the current picture-portion compared to the selected set of QR coefficients as stored in the codebook. In some embodiments, the update mechanism may not be used, in which case, the determination in block 2165 may always be negative. In embodiments that use an update mechanism, routine 2100 may determine whether the updated QR coefficients would improve the reproduction fidelity to a sufficient degree to justify the bit cost of sending the update. If an update is determined, then in subroutine block 2200 (see FIG. 22, discussed below) adjustment values are determined and encoded to update the selected set of QR coefficients at the decoder. In some embodiments, the adjustment values may include quantized transform coefficients representing differentials between calculated filter coefficients and the approximate match found from the codebook.

In ending loop block 2190, routine 2100 loops back to block 2130 to process the next picture-portion (if any). In ending loop block 2195, routine 2100 loops back to block 2110 to process the next picture (if any). Once all pictures have been processed, routine 2100 ends in block 2199.

Figure 22:
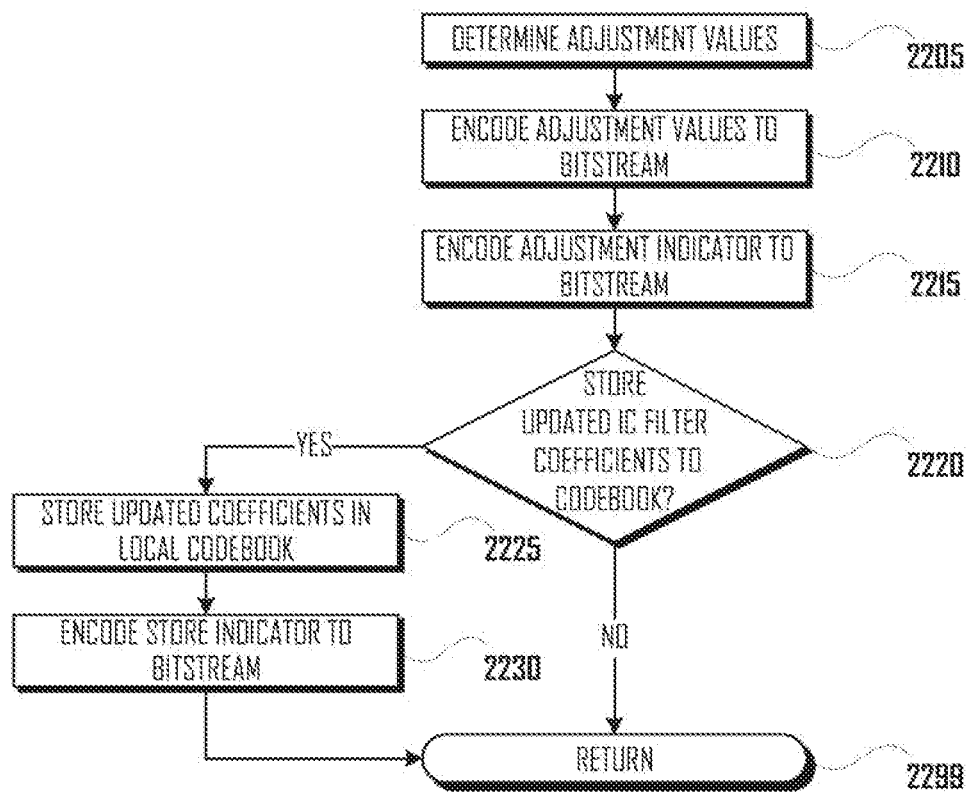
FIG. 22 illustrates a QR filter coefficient-set update subroutine, in accordance with one embodiment.

FIG. 22 illustrates a QR filter coefficient-set update subroutine 2200, in accordance with one embodiment. In block 2205, subroutine 2200 determines a set of adjustment values for adjusting a codebook-stored set of QR filter coefficients. For example, in one embodiment, the adjustment values may include differential coefficient values between the codebook-stored set and a target set of QR filter coefficients.

In block 2210, subroutine 2200 encodes the adjustment values to a bitstream to enable a decoder to obtain the adjustment values. In some embodiments, encoding the adjustment values may include computing a frequency-domain representation of the adjustment values and entropy coding the frequency-domain representation according to a reverse zigzag scan order, possibly including only a masked subset of AC coefficients (see, e.g., FIG. 16*b*, discussed above).

In block 2215, subroutine 2200 encodes into the bitstream an adjustment indicator directing the video decoder to adjust the codebook-stored set of QR filter coefficients according to the encoded adjustment values before configuring the decoder's quality restoration filter to process the current portion of the current picture. (See, e.g., bit fields 1910-1911, as illustrated in FIG. 19 and discussed above.)

In decision block 2220, subroutine 2200 determines whether to store the adjusted set of QR filter coefficients in the codebook so that the updated QR filter coefficients can be re-used without sending the adjustment values again. If so, then in block 2225, subroutine 2200 stores the adjusted set of QR filter coefficients in the encoder's local copy of the codebook, and in block 2230, subroutine 2200 encoder a store indicator to the bitstream adjustment indicator directing the video decoder to store the adjusted coefficient values in the decoder's copy of the codebook. In some embodiments, the store mechanism may not be used, in which case, the determination in block 2220 may always be negative. In embodiments that use the store mechanism, routine 2100 may determine whether the adjusted QR coefficients are likely to be subsequently re-used. Subroutine 2200 ends in block 2299.

Figure 23:
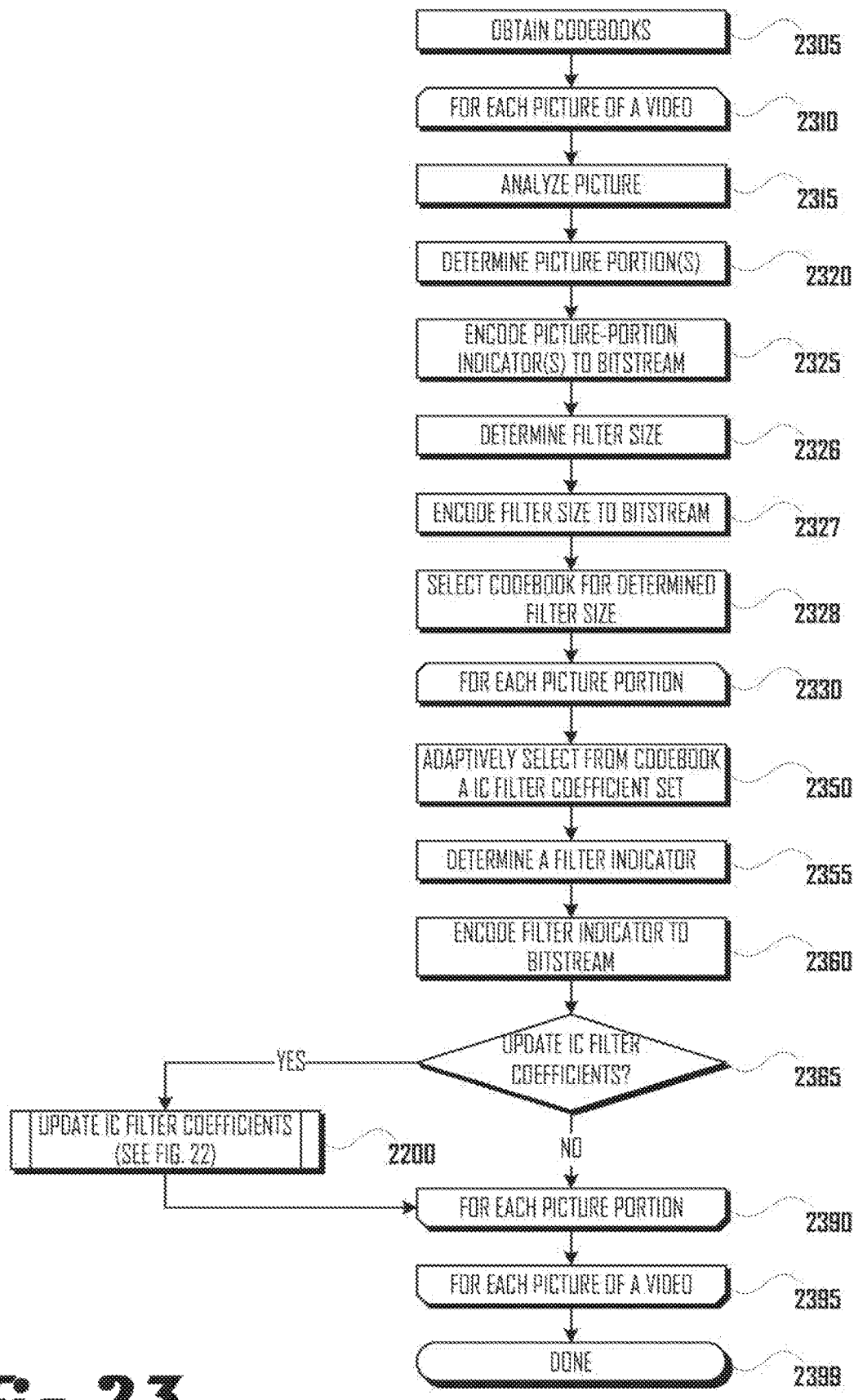
FIG. 23 illustrates a routine for encoding and updating a QR filter for a picture of a video into a bitstream using one or more codebooks, in accordance with one embodiment.

FIG. 23 illustrates a routine 2300 for encoding a QR filter for a picture of a video into a bitstream using one or more codebooks, in accordance with one embodiment. In block 2305, routine 2300 obtains one or more codebooks, each including a plurality of sets of coefficients for a QR filter of a given size. In one embodiment, each codebook may include 256 sets of filter coefficients, sorted according to a representative coefficient (e.g., sorted according to center coefficient). Other embodiments may include smaller or larger codebooks, sorted according to different criteria. In one embodiment, one or more of the codebooks may include coefficients for QR filters of size 3×3, 5×5, 7×7, 9×9, 11×11, and the like.

Beginning in starting loop block 2310, routine 2300 processes each picture or frame of a video. In block 2315, routine 2300 analyzes the current picture. For example, in one embodiment, routine 2300 may determine one or more image characteristics, such as a contrast level and/or whether the current picture represents a scene change compared to a previous picture.

In block 2320, routine 2300 determines one or more portions of the current picture. For example, FIG. 10a-f, discussed above, illustrate various exemplary portions into which a picture may be divided, according to various embodiments. In some embodiments, the number of portions that routine 2300 determines may be determined, at least in part, according to a picture type of the current picture. (See, e.g., FIG. 20b, discussed above.)

In block 2325, routine 2300 encodes one or more picture-portion indicators to a bitstream. For example, in one embodiment, routine 2300 may encode one or more of fields 902-1905, as illustrated in FIG. 19 and discussed above.

In block 2326, routine 2300 determines a filter size for the current picture. In block 2327, routine 2300 encodes the determined filter size to the bitstream (see, e.g., field 1907 in FIG. 19, discussed above.) For example, when the current picture is 'low contrast,' a larger filter size (e.g. 9×9) may be determined. On the other hand when the input picture is 'high contrast', a smaller filter size (e.g. 5×5) may be determined if the coding quality is high, or a medium filter size (e.g., 7×7) if the coding quality is medium to low. For medium-contrast scenes, a medium filter size (e.g., 7×7) may be determined when coding quality is sufficient, or a large filter size (e.g., 9×9) when coding quality is low. In some embodiments, the filter size information is sent on a picture or frame basis. In other embodiments, filter size information may be determined and sent for each portion of a picture (not shown).

In block 2328, routine 2300 selects a codebook having sets of coefficients for QR filters of the selected size. Beginning in starting loop block 2330, routine 2300 processes each of the one or more determined picture portions.

In block 2350, routine 2300 adaptively selects a set of QR coefficients from the codebook to improve how faithfully the video decoder reproduces the current picture-portion when the set of QR coefficients is used to configure the decoder's quality restoration filter to process the current picture-portion.

In block 2355, routine 2300 determines a filter indicator, such as an index into the codebook, for the selected set of QR coefficients. In block 2360, routine 2300 encodes the filter indicator into the bitstream to enable a decoder to locate the selected set of QR coefficients from the decoder's copy of the codebook.

In decision block 2365, routine 2300 determines whether to send an update to the selected set of QR coefficients to further improve how faithfully the video decoder reproduces the current picture-portion compared to the selected set of QR coefficients as stored in the codebook. In some embodiments, the update mechanism may not be used, in which case, the determination in block 2365 may always be negative. In embodiments that use an update mechanism, routine 2300 may determine whether the updated QR coefficients would improve the reproduction fidelity to a sufficient degree to justify the bit cost of sending the update. If an update is determined, then in subroutine block 2200 (see FIG. 22, discussed above) adjustment values are determined and encoded to update the selected set of QR coefficients at the decoder.

In ending loop block 2390, routine 2300 loops back to block 2330 to process the next picture-portion (if any). In ending loop block 2395, routine 2300 loops back to block 2310 to process the next picture (if any). Once all pictures have been processed, routine 2300 ends in block 2399.

Figure 24:
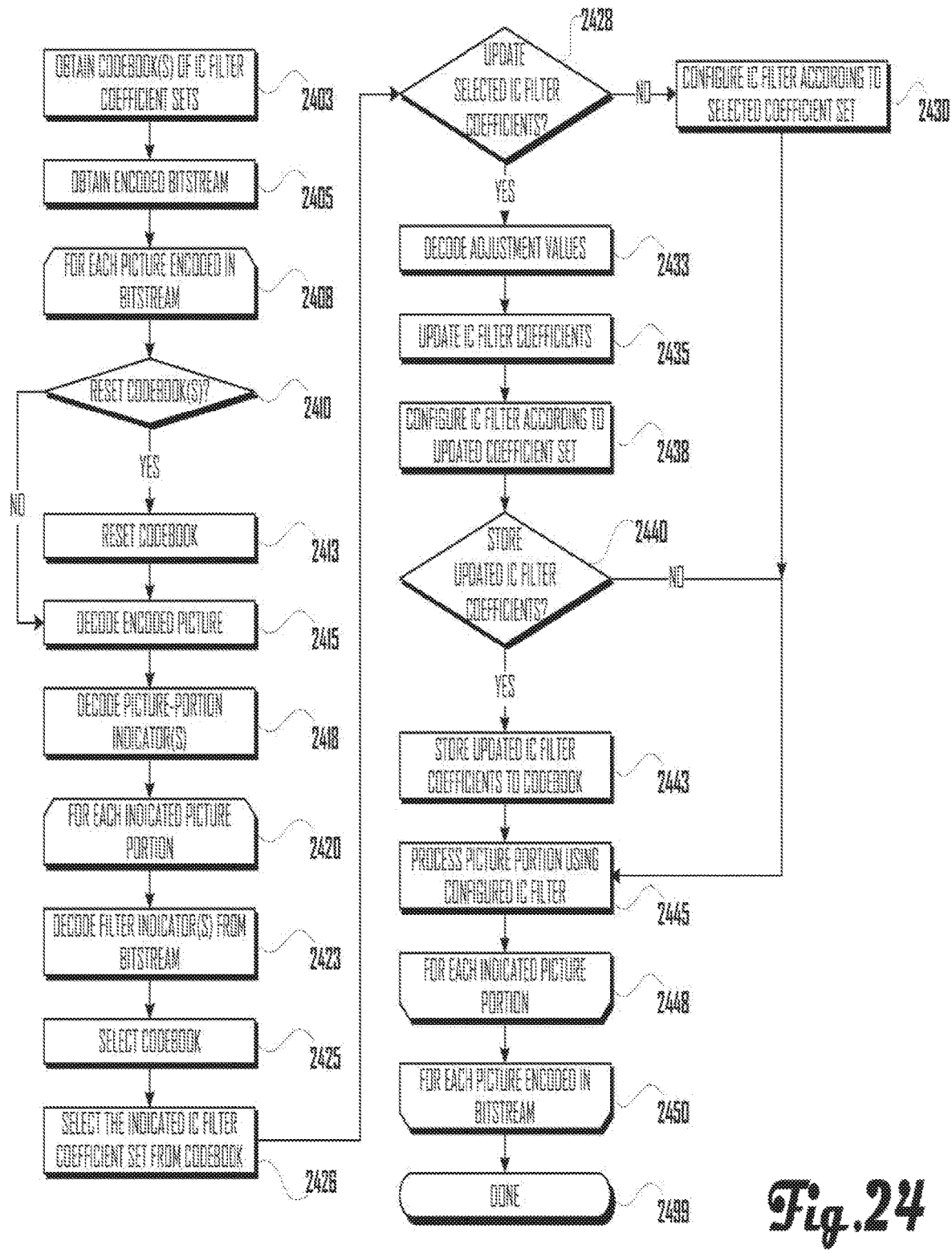
FIG. 24 illustrates a routine for decoding a QR filter for a picture of a video from a bitstream using one or more codebooks, in accordance with one embodiment.

FIG. 24 illustrates a routine 2400 for decoding a QR filter for a picture of a video from a bitstream using one or more codebooks, in accordance with one embodiment. In block 2403, routine 2400 obtains one or more codebooks, each including a plurality of sets of coefficients for a QR filter of a given size. These codebooks are copies of the codebooks available to encoding routines 2200 and/or 2400, discussed above.

In block 2405, routine 2400 obtains an encoded bitstream including encoded data corresponding to a plurality of pictures or frames of a video. Beginning in starting loop block 2408, routine 2400 processes each picture encoded in the bitstream.

In decision block 2410, routine 2400 determines whether to reset one or more of the codebooks according to one or more reset signals encoded into the bitstream. For example, in one embodiment, the encoder may direct routine 2400 to reset codebooks at scene changes or at other times. If a reset signal in the bitstream indicates that one or more of the codebooks should be reset (i.e., any previous updates discarded), then in block 2413 the indicated codebook(s) are reverted to their original state.

In block 2415, routine 2400 decodes the current encoded picture. In block 2418, routine 2400 decodes one or more picture-portion indicators from the bitstream. For example, in one embodiment, routine 2400 may decode one or more of fields 1902-1905, as illustrated in FIG. 19 and discussed above.

Beginning in starting loop block 2420, routine 2400 processes each of the one or more indicated picture-portions. In block 2423, routine 2400 decodes one or more filter indicators from the bitstream. For example, in one embodiment, routine 2400 may decode one or more of fields 1906-1909, as illustrated in FIG. 19 and discussed above.

In block 2425, routine 2400 selects one of the one or more codebooks obtained in block 2403 according to one or more of the decoded filter indicators (e.g., field 1907). In some embodiments, if there was only a single codebook obtained in block 2403, the one or more of the decoded filter indicators may be omitted, and routine 2400 may simply select the single codebook. In block 2426, routine 2400 selects from the selected codebook a set of QR filter coefficients indicated by one or more of the decoded filter indicators (e.g., field 1908). In some embodiments, selecting the set of QR filter coefficients may further include computing a variation or transformation (e.g., a rotation or a mirror) of the set of QR filter coefficients, such as may be indicated by field 1909.

In decision block 2428, routine 2400 determines whether the bitstream has directed routine 2400 to adjust or update the selected set of QR filter coefficients. For example, in one embodiment, such a direction may be transmitted via field 1910. If no update direction has been sent, then in block 2430, routine 2400 configures a QR filter according to the selected set of QR filter coefficients. On the other hand, if an update direction has been sent, then in block 2433, routine 2400 decodes adjustment values (e.g., as sent via field 1911) from the bitstream and updates the selected set of QR filter coefficients according to the adjustment values in block 2435. In block 2430, routine 2400 configures the QR filter according to the updated or adjusted set of QR filter coefficients.

In decision block 2440, routine 2400 determines whether the bitstream has directed routine 2400 to store the updated or adjusted set of QR filter coefficients in the decoder's copy of the codebook so that the updated QR filter coefficients can be re-used. If such a direction has been received, then in block 2443, routine 2400 stores the updated or adjusted set of QR filter coefficients in the decoder's copy of the current codebook.

In block 2445, routine 2400 processes the current picture-portion using the configured QR filter to improve how faithfully the decoded picture-portion reproduces the corresponding portion of the unencoded original picture.

In ending loop block 2448, routine 2400 loops back to block 2420 to process the next picture-portion (if any). In ending loop block 2450, routine 2400 loops back to block 2408 to process the next picture (if any). Once all pictures have been processed, routine 2400 ends in block 2499.

Although specific embodiments have been illustrated and described herein, it will be appreciated by those of ordinary skill in the art that alternate and/or equivalent implementations may be substituted for the specific embodiments shown and described without departing from the scope of the present disclosure. This application is intended to cover any adaptations or variations of the embodiments discussed herein.

The invention claimed is:

1. A video-encoder-device-implemented method for encoding a set of impairments-compensation-filter coefficient values for an encoded video frame, the method comprising:
    obtaining, by the video encoder device, at least two codebooks, the first of the at least two codebooks including a first plurality of sets of impairments-compensation-filter coefficient values suitable for configuring a video-decoder impairments compensation filter of a first filter size to process frames of encoded video having at least a first image characteristic, the second of the at least two codebooks including a second plurality of sets of impairments-compensation-filter coefficient values suitable for configuring a video-decoder impairments compensation filter of a second filter size to process frames of encoded video having at least a second image characteristic, wherein said second filter size is smaller than said first filter size;
    during encoding of an unencoded frame of video to generate an encoded bitstream, the video encoder device:
    differencing a block of unencoded video in the unencoded frame with a first impairments-compensated predication signal block from a motion compensation process to determine a residual block, transforming the residual block into a block of coefficients, quantizing the block of coefficients into a block of quantized coefficients, and encoding the block of quantized coefficients into the bitstream by an entropy coder;
    reverse quantizing and reverse transforming the block of quantized coefficients into a locally decoded block, assembling the locally decoded block into a locally assembled frame and deblock filtering the locally assembled frame into a deblocked frame;
    computing a target set of impairments-compensation-filter coefficient values according to the deblocked frame and the unencoded frame and forming an impairments-compensated reconstructed frame of video, which impairments-compensated reconstructed frame of video is used as a second impairments-compensated predication signal block;
    determining an image characteristic of the unencoded frame;
    selecting one of the at least two codebooks based at least in part on the determined image characteristic;
    adaptively selecting from the selected codebook a set of impairments-compensation-filter coefficient values to configure the impairments compensation filter to process the encoded frame to compensate for at least one coding artifact produced by the motion compensated transform coding process; and
    including in the encoded bitstream generated by the video encoder device a first indicator enabling the video decoder to select the selected codebook from the at least two codebooks, and a second indicator enabling the video decoded to select the selected set of impairments-compensation-filter coefficient values from the selected codebook.

2. The method of claim 1, wherein selecting one of the at least two codebooks based at least in part on the determined image characteristic comprises:
    determining a target filter size according to the determined image characteristic of the unencoded frame; and
    selecting a codebook based at least in part on the determined target filter size.

3. The method of claim 2, wherein determining the image characteristic of the unencoded frame comprises determining a contrast level of the unencoded frame.

4. The method of claim 3, wherein determining the target filter size according to the determined image characteristic of the unencoded frame comprises determining the target filter size according to the determined contrast level of the unencoded frame.

5. The method of claim 4, wherein determining the target filter size according to the determined contrast level of the unencoded frame comprises determining a larger filter size when the determined contrast level of the unencoded frame is lower, and determining a smaller filter size when the determined contrast level of the unencoded frame is higher.

6. The method of claim 2, wherein selecting the one of the at least two codebooks is further based at least in part on an encoding-quality metric associated with the encoding.

7. The method of claim 6, wherein determining the target filter size according to the determined image characteristic of the unencoded frame comprises determining the target filter size according to the encoding-quality metric.

8. The method of claim 7, wherein determining the target filter size according to the encoding-quality metric comprises determining a larger filter size when the encoding-quality metric is lower, and determining a smaller filter size when the encoding-quality metric is higher.

9. The method of claim 1, wherein said first plurality of sets of impairments-compensation-filter coefficient values comprise sets of coefficient values for a selected one of 5×5, 7×7, and 9×9 impairments compensation filters and wherein said second plurality of sets of impairments-compensation-filter coefficient values comprise sets of coefficient values for a different selected one of 5×5, 7×7, and 9×9 impairments compensation filters.

10. A video-encoder-device-implemented method for encoding a set of impairments-compensation-filter coefficient values for an encoded video frame, the method comprising:

obtaining, by the video encoder device, a codebook including a plurality of sets of impairments-compensation-filter coefficient values suitable for configuring an impairments compensation filter of a video decoder to process frames of encoded videos having a variety of characteristics;

during encoding of an unencoded frame of video to generate an encoded bitstream, the video encoder device:

differencing a block of unencoded video in the unencoded frame with a first impairments-compensated predication signal block from a motion compensation process to determine a residual block, transforming the residual block into a block of coefficients, quantizing the block of coefficients into a block of quantized coefficients, and encoding the block of quantized coefficients into the encoded bitstream by an entropy coder;

reverse quantizing and reverse transforming the block of quantized coefficients into a locally decoded block, assembling the locally decoded block into a locally assembled frame and deblock filtering the locally assembled frame into a deblocked frame;

adaptively selecting from the codebook a set of impairments-compensation-filter coefficient values to configure the impairments compensation filter to process at least the portion of the encoded frame to compensate for at least one coding artifact produced by a motion compensated transform coding process by computing the set of impairments-compensation-filter coefficient values according to the deblocked frame and the unencoded frame and forming an impairments-compensated reconstructed frame of video, which impairments-compensated reconstructed frame of video is used as a second impairments-compensated predication signal block;

determining a plurality of adjustment values for adjusting a respective plurality of the selected set of impairments-compensation-filter coefficient values to further improve how faithfully the video decoder reproduces at least the portion of the unencoded frame of video;

encoding the plurality of adjustment values; and including in the encoded bitstream generated by the video encoder device:

a selection indicator enabling the video decoder to select the selected set of impairments-compensation-filter coefficient values from the video decoder's copy of the codebook;

the encoded plurality of adjustment values; and an adjustment indicator directing the video decoder to adjust the selected set of impairments-compensation-filter coefficient values according to the encoded plurality of adjustment values before configuring the impairments compensation filter to process at least the portion of the encoded frame.

11. The method of claim 10, wherein the plurality of adjustment values is determined according to a plurality of differential coefficient values representing differences between the target set of impairments-compensation-filter coefficient values and the selected set of impairments-compensation-filter coefficient values.

12. The method of claim 11, wherein encoding the plurality of adjustment values comprises computing a frequency-domain representation of the plurality of differential coefficient values.

13. The method of claim 12, wherein encoding the plurality of adjustment values further comprises entropy coding the frequency-domain representation of the plurality of differential coefficient values according to a zigzag scan order ending with a DC coefficient of the frequency-domain representation of the plurality of differential coefficient values.

14. The method of claim 12, wherein encoding the plurality of adjustment values further comprises masking a plurality of AC coefficients of the frequency-domain representation of the plurality of differential coefficient values.

15. A video-decoder-device-implemented method for decoding a set of impairments-compensation-filter coefficient values for an encoded video frame, the method comprising:

obtaining, by the video decoder device, a codebook including a plurality of sets of impairments-compensation-filter coefficient values suitable for configuring an impairments compensation filter to process frames of decoded videos having a variety of characteristics;

obtaining an encoded bitstream including the encoded video frame and a selection indicator enabling the video decoder to select a set of impairments-compensation-filter coefficient values from the codebook;

during decoding of the encoded video frame, the video decoder device decoding the encoded video into a block of quantized coefficients, reverse quantizing and reverse transforming the block of quantized coefficients into a decoded residual block, adding to the residual block a first impairments-compensated predication signal block from a motion compensation predictor to form a locally decoded block, assembling the locally decoded block into a locally assembled frame and deblock filtering the locally assembled frame into a processed decoded frame of video and the video decoder device selecting from the codebook the set of impairments-compensation-filter coefficient values indicated by the selection indicator;

configuring, by the video decoder device, the impairments compensation filter according to the selected set of impairments-compensation-filter coefficient values;

processing, by the video decoder device, at least a portion of the decoded frame of video using the configured impairments compensation filter and utilizing motion vectors and the motion compensated predictor to produce a second impairments-compensated predication signal block which may be added to a subsequent decoded residual block; and rendering the processed decoded frame of video to a display associated with the video decoder device.

16. The method of claim 15, wherein the encoded bitstream further includes a second selection indicator enabling the video decoder to select a second set of impairments-compensation-filter coefficient values from the codebook and a portion-identification indicator enabling the video decoder to identify the portion and a second portion of the decoded frame.

17. The method of claim 16, further comprising:

during the decoding of the encoded video frame, the video decoder device selecting from the codebook the second set of impairments-compensation-filter coefficient values indicated by the second selection indicator;

re-configuring the impairments compensation filter according to the second selected set of impairments-compensation-filter coefficient values; and processing the second portion of the decoded frame of video using the re-configured impairments compensation filter to further improve how faithfully the decoded frame of video reproduces the corresponding unencoded source-frame of video.

18. The method of claim 15, wherein the encoded bitstream further includes update data and an update indication directing the video decoder to update the codebook according to the update data.

19. The method of claim 18, further comprising applying the update data to the selected set of impairments-compensation-filter coefficient values in the codebook before configuring the impairments compensation filter.

20. The method of claim 19, further comprising, during subsequent decoding of a second encoded frame of video, discarding the previously applied update to the codebook in response to a reset indication included in the encoded bitstream;
    obtaining, by the video decoder device, a codebook including a plurality of sets of impairments-compensation-filter coefficient values suitable for configuring a impairments compensation filter to process frames of decoded videos having a variety of characteristics;
    obtaining an encoded bitstream including the encoded video frame and a selection indicator enabling the video decoder to select a set of impairments-compensation-filter coefficient values from the codebook; and
    during decoding of the encoded video frame, the video decoder device selecting from the codebook the set of impairments-compensation-filter coefficient values indicated by the selection indicator.

21. The method of claim 15, further comprising:
obtaining a second codebook including a second plurality of sets of impairments-compensation-filter coefficient values; and
during decoding of the encoded video frame, selecting one of the codebook and the second codebook according to a selection indicator included in the encoded bitstream before selecting from the selected codebook the set of impairments-compensation-filter coefficient values indicated by the selection indicator.

22. A video-decoder-device-implemented method for decoding a set of impairments-compensation-filter coefficient values for an encoded video frame, the method comprising:
    obtaining, by the video decoder device, a codebook including a plurality of sets of impairments-compensation-filter coefficient values suitable for configuring a impairments compensation filter to process frames of decoded videos having a variety of characteristics;
    obtaining an encoded bitstream including the encoded video frame, a selection indicator enabling the video decoder to select a set of impairments-compensation-filter coefficient values from the codebook, an encoded plurality of adjustment values, and an adjustment indicator directing the video decoder to adjust the selected set of impairments-compensation-filter coefficient values according to the encoded plurality of adjustment values;
    during decoding of the encoded video frame, the video decoder device decoding the encoded video frame into a block of quantized coefficients, reverse quantizing and reverse transforming the block of quantized coefficients into a decoded residual block, adding to the residual block a first impairments-compensated predication signal block from a motion compensation predictor to form a locally decoded block, assembling the locally decoded block into a locally assembled frame and deblock filtering the locally assembled frame into a processed decoded frame of video and the video decoder device selecting from the codebook the set of impairments-compensation-filter coefficient values indicated by the selection indicator and adjusting the selected set of impairments-compensation-filter coefficient values according to the encoded plurality of adjustment values;
    configuring, by the video decoder device, the impairments compensation filter according to the adjusted selected set of impairments-compensation-filter coefficient values;
processing, by the video decoder device, at least a portion of the decoded frame of video using the configured impairments compensation filter and utilizing motion vectors and the motion compensated predictor to produce a second impairments-compensated predication signal block which may be added to a subsequent decoded residual block; and
rendering the processed decoded frame of video to a display associated with the video decoder device.

* * * * *